(12) United States Patent
Cohn et al.

(10) Patent No.: US 7,326,024 B2
(45) Date of Patent: Feb. 5, 2008

(54) WHEELCHAIR LIFT ASSEMBLY HAVING A COMPACT STOWED PROFILE

(75) Inventors: Alan Cohn, Lockeford, CA (US); David Johnson, Modesto, CA (US); Edward Wagner, Salida, CA (US); Donald Morris, Conifer, CO (US)

(73) Assignee: Lift-U, division of Hogan Mfg., Inc., Escalon, CA (US)

( * ) Notice: Subject to any disclaimer, the term of this patent is extended or adjusted under 35 U.S.C. 154(b) by 340 days.

(21) Appl. No.: 10/782,535

(22) Filed: Feb. 18, 2004

(65) Prior Publication Data

US 2004/0228713 A1 Nov. 18, 2004

Related U.S. Application Data

(60) Provisional application No. 60/448,620, filed on Feb. 19, 2003.

(51) Int. Cl.
*B60P 1/44* (2006.01)

(52) U.S. Cl. ........................ 414/546; 414/921

(58) Field of Classification Search ................ 414/546, 414/549, 558, 921
See application file for complete search history.

(56) References Cited

U.S. PATENT DOCUMENTS

| | | | | |
|---|---|---|---|---|
| 4,124,130 A | * | 11/1978 | Rohrs et al. | 414/539 |
| 4,442,921 A | * | 4/1984 | Sherman | 187/403 |
| 4,711,613 A | * | 12/1987 | Fretwell | 414/550 |
| 4,718,812 A | * | 1/1988 | Smalley et al. | 414/540 |
| RE33,595 E | * | 5/1991 | Sullivan et al. | 187/200 |
| 5,024,420 A | | 6/1991 | Downing | |
| 5,040,936 A | | 8/1991 | Rhea | |
| 5,110,252 A | * | 5/1992 | Aoki | 414/549 |
| 5,261,779 A | * | 11/1993 | Goodrich | 414/546 |
| 5,556,250 A | * | 9/1996 | Fretwell et al. | 414/558 |
| 5,605,431 A | * | 2/1997 | Saucier et al. | 414/546 |
| 5,674,043 A | * | 10/1997 | Dorn | 414/541 |
| 5,865,593 A | * | 2/1999 | Cohn | 414/546 |
| 5,975,830 A | * | 11/1999 | Goodrich et al. | 414/541 |
| 6,012,547 A | * | 1/2000 | Sykes | 182/113 |
| 6,039,528 A | | 3/2000 | Cohn | |
| 6,042,327 A | | 3/2000 | DeLeo et al. | |
| 6,065,924 A | | 5/2000 | Budd et al. | |
| 6,077,025 A | * | 6/2000 | Budd et al. | 414/546 |
| 6,203,266 B1 | * | 3/2001 | Savaria et al. | 414/546 |
| 6,238,169 B1 | * | 5/2001 | Dupuy et al. | 414/546 |
| 6,305,897 B1 | * | 10/2001 | Budd et al. | 414/540 |
| 6,309,170 B1 | | 10/2001 | Vartanian | |
| 6,558,106 B2 | * | 5/2003 | Sardonico | 414/556 |
| 2003/0213653 A1 | * | 11/2003 | Morris | 187/269 |

FOREIGN PATENT DOCUMENTS

| | | | |
|---|---|---|---|
| JP | 2003-118473 | * | 4/2003 |
| WO | WO 92/10422 | * | 6/1992 |

* cited by examiner

*Primary Examiner*—James Keenan
(74) *Attorney, Agent, or Firm*—Christensen O'Connor Johnson Kindness PLLC

(57) ABSTRACT

A lift assembly 20 includes an enclosure 24 secured to the bottom floor F of the baggage compartment BC, a carriage 28 reciprocally mounted within the enclosure 24, and a lift platform 32 pivotally coupled to the carriage 28. The lift platform 32 may be equipped with a variety of safety features, such as a ramp barrier, a bridge barrier, a pair of handrails, and combinations thereof for providing protection and a sense of security for a passenger while on the lift platform.

16 Claims, 26 Drawing Sheets

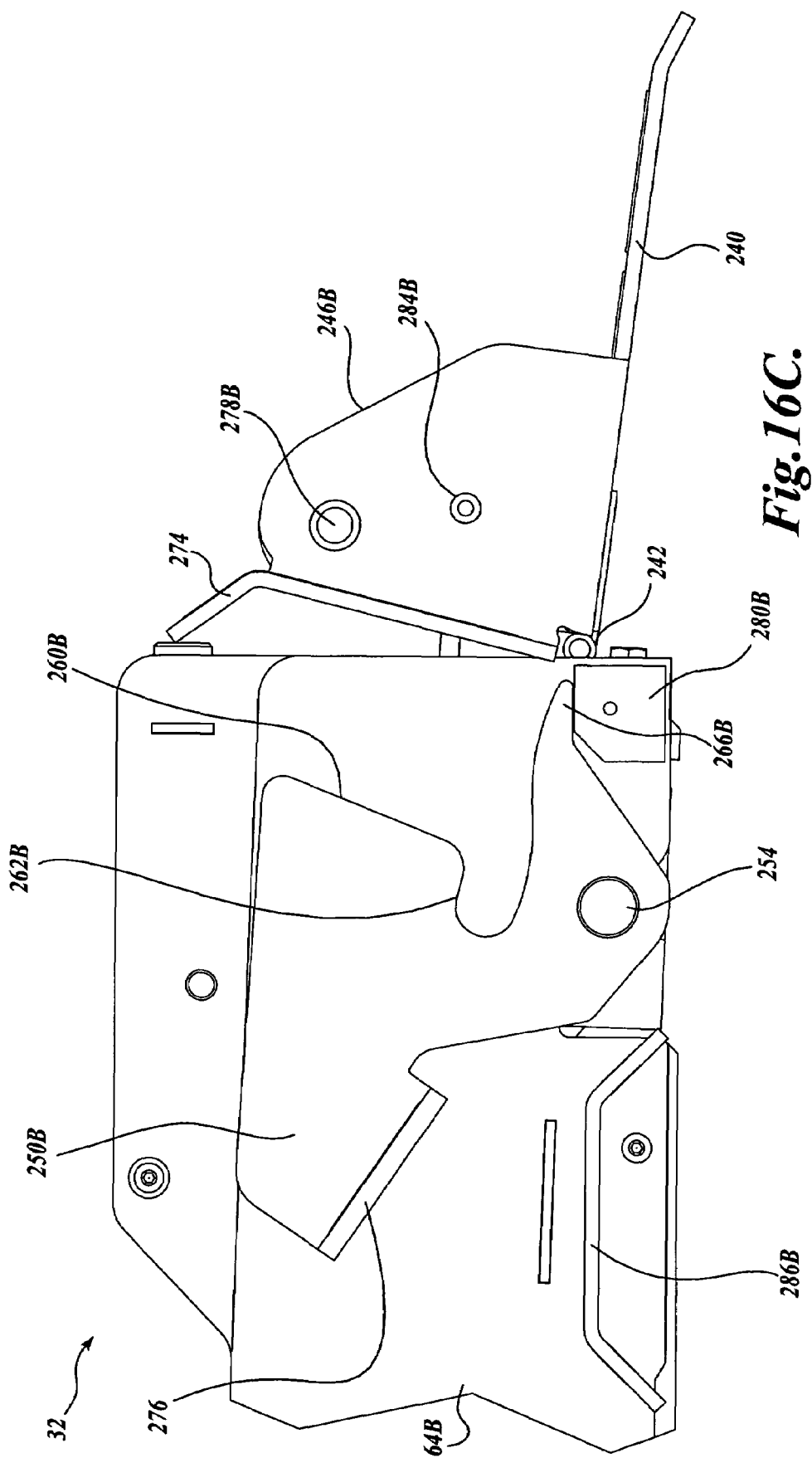

WHEELCHAIR LIFT ASSEMBLY HAVING A COMPACT STOWED PROFILE

CROSS-REFERENCES TO RELATED APPLICATION

This application claims the benefit of U.S. Provisional Application No. 60/448,620, filed Feb. 19, 2003, the disclosure of which is hereby incorporated by reference.

FIELD OF THE INVENTION

The present invention relates generally to wheelchair lifts to be used on vehicles, and in particular, to such lifts for use on tour or highway buses or other vehicles.

BACKGROUND OF THE INVENTION

In recent years there has been a recognized and, therefore, growing need to accommodate the needs of those in wheelchairs on public transportation. One such type of public transportation is that of touring or "over the road" buses used for inter-city travel, which have their interior floors substantially higher off the ground than do transit buses. To accommodate the needs of those in wheelchairs on touring buses, a lift platform that can be stored in a compartment under the passenger seating area, such as a baggage compartment, of a tour bus has been proposed. In use, the compartment door is opened and the lift platform is actuated to the deployed position, wherein the lift platform extends outward from the bus. Once in the deployed position, the lift platform may be raised or lowered between ground level and the floor level of the bus. Once the passenger has boarded or deboarded the bus, the operator returns the lift platform to the deployed position, and then actuates the lift platform to the stowed position.

SUMMARY OF THE INVENTION

In accordance with aspects of the present invention, a lift assembly adapted to be affixed to a vehicle for movement of a load between raised and lowered positions is provided. The lift assembly includes mounting structure attachable to the vehicle and carriage structure associated with the mounting structure. The carriage structure is movable along the mounting structure between a stowed position and a deployed position. The lift assembly also includes platform structure having opposite first and second sides and inboard and outboard ends. The platform structure is pivotally coupled to the carriage structure for movement between raised and lowered positions and a stowable position existing in-between the raised and lowered positions. The lift assembly further includes first and second handrails pivotally coupled to the platform structure. The first and second handrails are movable between an extended position in which the first and second handrails extend upwardly from the platform structure, and a retracted position in which the first and second handrails are arranged along the first and second sides of the platform structure, respectively. The movement of at least one handrail to the extended position automatically locks the handrail in the extended position. The lift assembly further includes a first drive assembly conditionally operated for effecting reciprocal movement of the carriage structure between the stowed and deployed positions and a second drive assembly conditionally operated for effecting reciprocal movement of the platform structure between the raised and lowered positions.

In accordance with another aspect of the present invention, a lift platform is provided that includes a lift deck defining length-wise sides and width-wise ends and a pair of handrails pivotally mounted on the sides of the lift deck. The handrails are pivotally movable between an extended position in which the handrails extend upwardly from the lift deck, and a retracted position in which the handrails extend along the sides of the lift deck substantially parallel therewith. The lift platform further includes a coupling linking movement of the first and second handrails and at least one locking assembly for locking the handrails in the extended position.

In accordance with yet another aspect of the present invention, a lift platform is provided that includes a lift platform surface having an inboard edge and an outboard edge and an inboard barrier pivotally connected to the lift platform along at least a portion of the inboard edge. The barrier is movable between at least a lowered ramp position extending outwardly from the lift platform surface, and a raised, safety barrier position extending upwardly from the lift platform surface. The lift platform further includes a lever linked to the barrier. The lever effects movement of the barrier between the ramp and safety barrier positions, wherein the lever includes a handle portion that may be grasped by an operator to manually articulate the barrier.

In accordance with still another aspect of the present invention, a wheelchair lift platform is provided that includes a lift deck defining length-wise sides and width-wise ends and a pair of handrails pivotally mounted on the sides of the lift deck. The handrails are pivotally movable between an extended position in which the handrails extend upwardly from the lift deck and a retracted position in which the handrails extend along the sides of the lift deck substantially parallel therewith. The lift platform also includes at least one barrier pivotally attached to one end of the lift deck. The barrier is moveable between a ramp position, a barrier position, and a stowable position in which the barrier is disposed in-between the ramp and barrier positions, wherein movement of at least one of the handrails from the retracted position to the extended position causes the barrier to move from the stowable position to the barrier position.

In accordance with yet another aspect of the present invention, a wheelchair lift assembly for raising and lowering a wheelchair between two surfaces disposed at different elevations is provided. The wheelchair lift includes a wheelchair platform and at least one wheelchair barrier pivotally attached to one end of the wheelchair platform. The wheelchair barrier is moveable between a ramp position in which a wheelchair is permitted to enter into or exit from the wheelchair platform and an upright barrier position in which a wheelchair is not permitted to enter into or exit from the wheelchair platform. The barrier includes an energy dissipation device for dissipating energy in the event of a wheelchair collision against the barrier when the barrier is in the barrier position. The energy dissipation device is an area of reduced strength oriented along a portion of the barrier, wherein the area of reduced strength yields when impacted by a wheelchair.

In accordance with yet still another aspect of the present invention, a wheelchair lift assembly is provided that comprises a wheelchair platform having inboard and outboard edges and at least one wheelchair barrier pivotally attached to either inboard or outboard edge of the wheelchair platform. The wheelchair barrier is moveable between a ramp position in which the wheelchair barrier extends outwardly from the end of the wheelchair platform to permit movement of a wheelchair across the edge of the platform and a safety barrier position in which the wheelchair safety barrier prevents a wheelchair from inadvertent movement across the edge of the platform. The lift assembly further includes a barrier locking assembly coupled to the wheelchair platform. The barrier locking assembly has an unlocked state in which the wheelchair barrier is moveable between the ramp position and the safety barrier position and a locked state in which the barrier locking assembly mechanically prevents the wheelchair barrier from moving from the safety barrier position to the ramp position. The barrier locking assembly includes a latch member pivotally attached to one side of the platform and biased toward the inboard or outboard edge of the wheelchair platform. The latch member defines a contact surface and a latch engagement member retaining surface. The barrier locking assembly further includes a latch engagement member disposed on the barrier. The latch engagement member is configured and arranged to be engaged and retained by the latch engagement member retaining surface when the wheelchair barrier is in the safety barrier position.

In accordance with yet another aspect of the present invention, a wheelchair lift assembly is provided that includes a lift platform having first and second ends and at least one platform barrier pivotally attached to one end of the lift platform. The platform barrier us moveable between a ramp position in which the barrier extends outwardly from the end of the lift platform and a safety barrier position in which the barrier extends upwardly from the lift platform. The lift assembly further includes a foot pedal mechanism that actuates the platform barrier between the ramp position and the safety barrier position.

In accordance with yet still another aspect of the present invention, a wheelchair lift assembly is provided that includes a mounting structure, a carriage moveable relative to the mounting structure in a substantially linear direction between a stowed position and a deployed position, and a platform configured to support a load. The platform includes a lift deck having length-wise sides and width-wise inboard and outboard ends and a pair of handrails pivotally mounted on the sides of the lift deck. The handrails are pivotally movable between an extended position in which the handrails extend upwardly from the lift deck and a retracted position in which the handrails extend along the sides of the lift deck substantially parallel therewith. The platform also includes an inboard barrier pivotally connected to the lift deck at the inboard end. The inboard barrier is movable between a bridge position, a safety barrier position, and a stowable position in which the platform structure may be moved by the carriage structure between the carriage stowed and carriage deployed positions. The platform further includes an outboard barrier pivotally connected to the lift deck at the outboard end. The outboard barrier is movable between a ramp position and a safety barrier position. The lift assembly also includes a pair of linkage members pivotally coupling the platform to the carriage. The platform is movable between raised and deployed positions when the carriage has attained the deployed position. The lift assembly further includes a platform drive assembly conditionally energized for effecting reciprocal movement of the platform structure between the raised and lowered positions and at least one electrical disabler associated with the platform. The electrical disabler disables the platform drive assembly so as to inhibit movement of the platform when one of the following conditions is present: 1) the handrails have not attained the extended position; 2) the inboard barrier has not attained the inboard safety barrier position; or 3) the outboard barrier has not attained the outboard safety barrier position.

In accordance with still another aspect of the present invention, a wheelchair lift assembly adapted to be affixed to a vehicle for movement of a load between raised and lowered positions is provided. The lift assembly includes a mounting enclosure attachable to the vehicle, platform structure having opposite first and second sides and inboard and outboard ends and movable within the mounting enclosure between a completely stowed position and a completely deployed position, and first and second handrails pivotally mounted to the platform structure at the first and second sides, respectively. The handrails are pivotally movable between an extended position in which the handrails extend upwardly from the platform structure and a retracted position in which the handrails are in a position that allows the platform to move between the completely stowed and completely deployed positions. The lift assembly also includes an inboard barrier pivotally connected to the inboard end of the platform structure. The inboard barrier is movable between at least a bridge position extending inboard from the platform structure to provide ingress/egress between the platform structure and a surface of the vehicle, a raised, safety barrier position for preventing such ingress/egress, and a stowed position in which the platform structure may be moved between the completely stowed and completely deployed positions. The lift assembly further includes an outboard barrier pivotally connected to the outboard end of the platform structure. The outboard barrier is movable between a ramp position extending outboard from the platform structure to provide ingress/egress between the platform structure and a ground surface, and a raised, safety barrier position for preventing such ingress/egress, wherein either of the ramp or the safety barrier positions of the outboard barrier allow the platform structure to move between the completely stowed and completely deployed positions.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein:

FIGS. 16A-16C are sequential partial side elevational views of the lift platform taken from the side opposite FIG. 15A-15C, depicting the ramp barrier moving from the barrier position to the ramp position.

DETAILED DESCRIPTION OF THE PREFERRED EMBODIMENT

The present invention will now be described with reference to the accompanying drawings where like numerals correspond to like elements. FIGS. 1-17 illustrate one exemplary embodiment of a compact stowable passenger lift assembly for use in a bus of the touring or "over the road" type, commonly referred to as an inter-city bus. While the invention has been described with reference to its installation on inter-city buses, it will be apparent to one skilled in the art that this is done for illustrative purposes and should not be construed as limiting the scope of the invention. Thus, it will be apparent to one skilled in the art that aspects of the present invention may be employed into other vehicles, such as a railway car. Additionally, although illustrative terms such as vertical, horizontal, inboard, and outboard are used herein, they are descriptive in nature and should not be construed as limiting. Further, it will be appreciated that embodiments of the present invention may employ any combination of features described herein.

Figure 1:
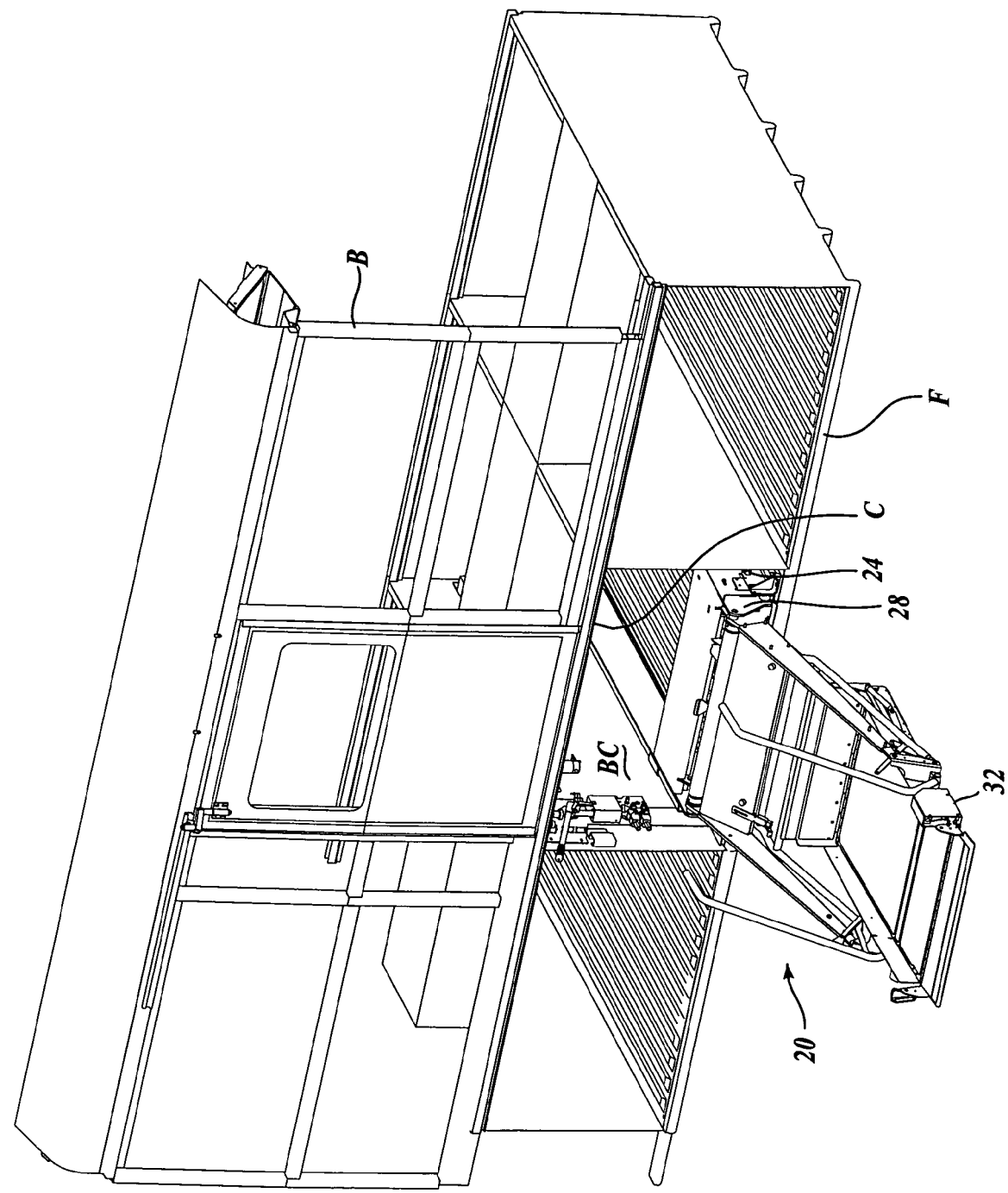
FIG. 1 is a partial side perspective view of an inter-city bus into which a compact stowable passenger lift assembly constructed in accordance with the present invention is mounted.

One illustrative embodiment of a compact stowable passenger lift assembly, generally designated 20, formed in accordance with the present invention is shown in FIG. 1. FIG. 1 is a partial side perspective view of an inter-city bus B into which the compact stowable passenger lift assembly 20 (hereinafter "lift assembly 20") is mounted. As shown, the lift assembly 20 is mounted into one of a series of baggage compartments BC spaced along the length of the inter-city bus B. The baggage compartments BC may extend from one side of the bus B to the other, and are defined by a bottom floor F spaced from a ceiling C a sufficient distance to accommodate the lift assembly 20 and extra baggage or the like. The lift assembly 20 is depicted in the deployed and lowered position in FIG. 1. Generally described, the lift assembly 20 includes an enclosure 24 secured to the bottom floor F of the baggage compartment BC, a carriage 28 reciprocally mounted within the enclosure 24, and a lift platform 32 pivotally coupled to the carriage 28.

In operation, when a physically disabled passenger wishes to board or deboard an inter-city bus equipped with the lift assembly 20, the operator opens the door(s) (not shown) to the baggage compartment BC. The operator then actuates the carriage 28 through user operated control switches 34 (see FIG. 17) of a electric control panel to reciprocate the carriage 28 from the stowed position, wherein the carriage 28 and lift platform 32 are nested within the enclosure 24, to the deployed position, wherein the lift platform 32 extends outward from the bus B, substantially parallel to the bottom floor F of the baggage compartment BC. Once in the deployed position, the lift platform 32 may be raised to the floor level of the bus or lowered to ground level. Once the passenger has boarded into or deboarded from the bus B, the operator returns the lift platform 32 to the deployed position. The operator then actuates the carriage 28 to reciprocate the lift platform 32 to the stowed position.

Figure 2:
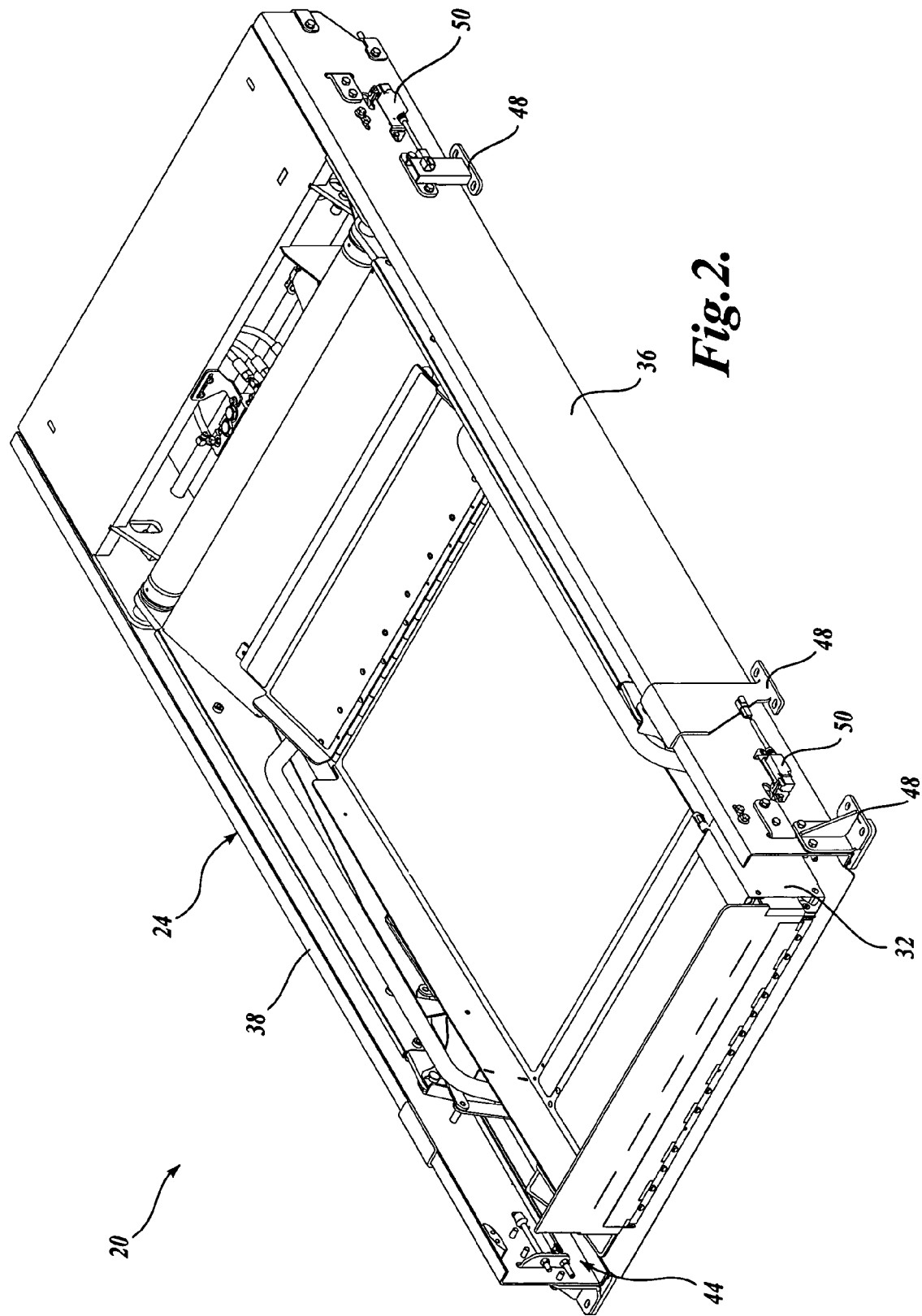
FIG. 2 is a side perspective view of a lift platform of the lift assembly nested within an enclosure of the lift assembly shown in FIG. 1 in the stowed position.

Referring now to FIG. 2, each of the components of the lift assembly 20 will be described in detail. FIG. 2 is a side perspective view of the lift platform 32 in the stowed position, nested within the enclosure 24. The enclosure 24 includes at least two side walls 36 and 38, and may include a top wall (not shown for clarity), which together define an opening 44 for permitting the lift platform 32 to reciprocate into and out of the enclosure 24. The enclosure 24 is rectangular in shape and is suitably dimensioned to be accommodated along the width dimension of one baggage compartment of an inter-city bus, transverse to the longitudinal axis of the bus. The enclosure 24 may include mounting brackets 48 or similar hardware, which accept bolts or other fasteners (not shown), for mounting the enclosure 24 to the bottom floor of the baggage compartment. As shown best shown in FIG. 1, the enclosure 24 is of a compact design such that when mounted within the baggage compartment BC, the enclosure 24 permits luggage or other accessories to be placed between the top wall of the enclosure 24 and the ceiling C of the baggage compartment BC. In one embodiment, the height of the enclosure 24 is approximately 9.50 inches.

Figure 3:
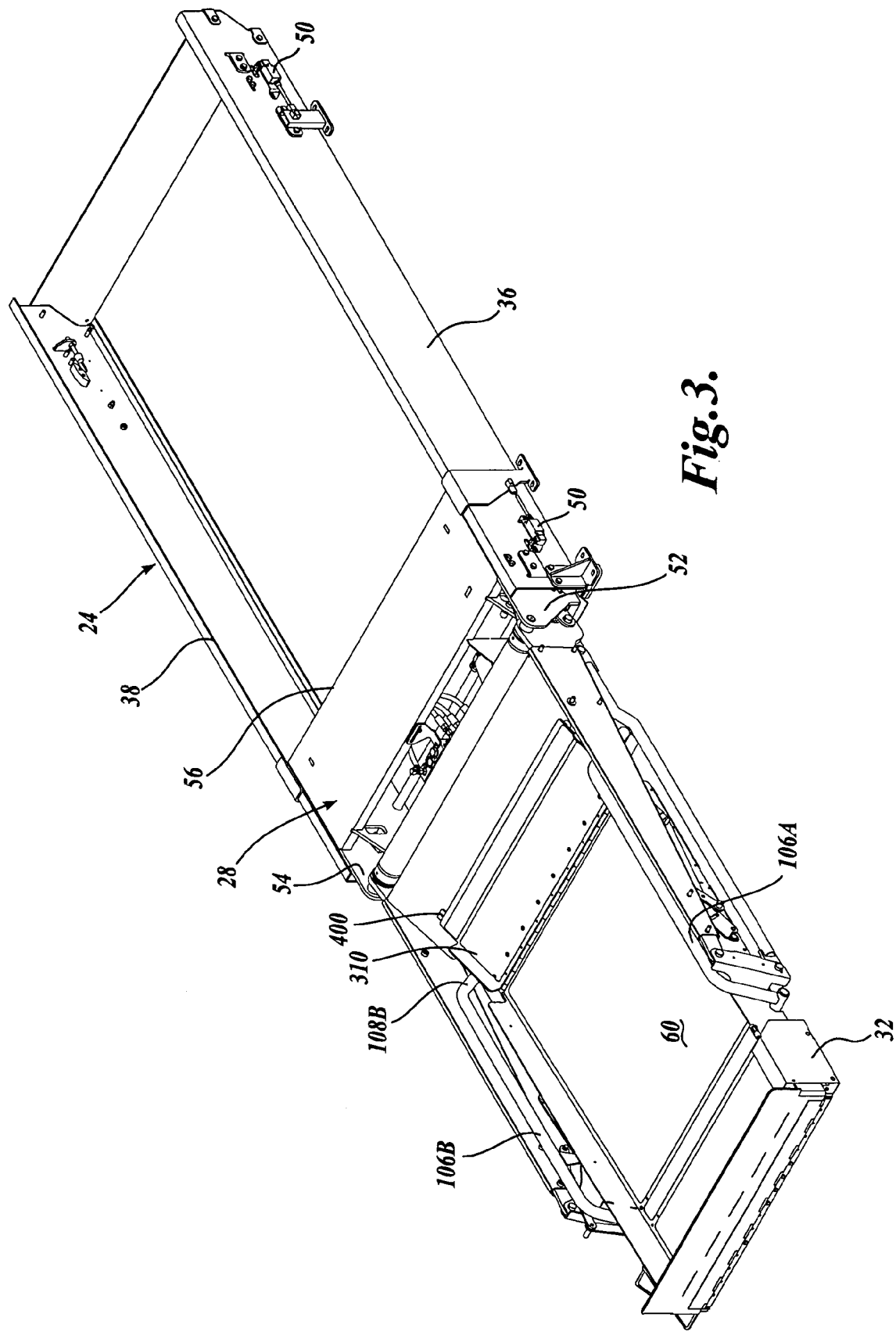
FIG. 3 is a side perspective view of the lift platform in the deployed position.

The carriage 28 is reciprocally mounted within the enclosure 24 for movement between a stowed position shown in FIG. 2, wherein the carriage is proximate to the end of the enclosure 24 opposite the opening 44, and a deployed position shown in FIG. 3, wherein the carriage 28 is partially extended outside the opening 44. The carriage 28 may be actuated between the stowed and deployed positions by a drive assembly 46, shown schematically in FIG. 17. The drive assembly 46 may employ the motor, chain, and sprocket arrangement disclosed in U.S. Pat. No. 5,110,252, the disclosure of which is incorporated by reference, or may use other transmissions, such as pulley/cable arrangements, rack/pinion arrangements, or belt drives, in combination with an electrical or mechanical motor. All of these drive assemblies are well known in the art, and thus, will not be described in any more detail. Other drive systems may alternatively be used to move the carriage 28 between the stowed and deployed position, such as hydraulic or pneumatic actuators that receive and exhaust pressurized fluid received by a motorized pump/valve arrangement, which is well known in the art, and thus, will not be described in any more detail. The drive assembly 46 is conventionally connected to and controlled by a control system 100.

In the embodiment shown, limit switches 50 may be located at the front and back of the enclosure 24. The limit switches 50 include an arm (not shown) that engages respective portions of the carriage 28 upon full deployment and full retraction of the lift platform 32. The limit switches 50 signal the control system of the lift assembly that the lift platform 32 is in the fully stowed or fully deployed positions. Once the lift platform 32 is in either position, power may be disconnected from the automated means.

Figure 4:
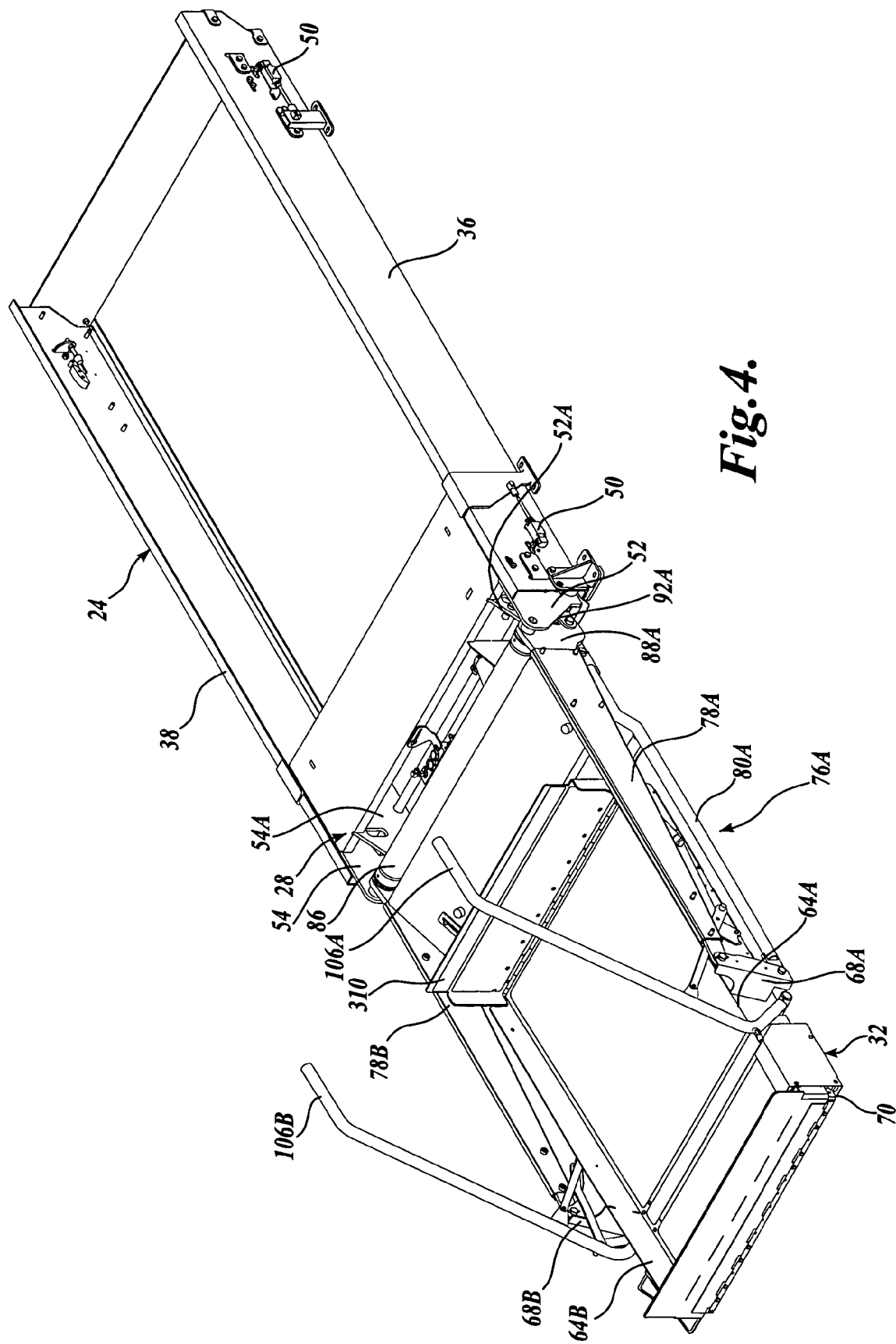
FIG. 4 is a side perspective view of the lift platform in the deployed position, wherein the handrails have been actuated to the extended position.

As best shown in FIGS. 3 and 4, the carriage 28 may include at least a pair of spaced-apart supports 52 and 54 oriented along the longitudinal axis of the enclosure interconnected by brace members, such as a top brace 56, to form a rigid, substantially rectangular body. The carriage 28 may include bumpers or rollers (not shown) that are received within guides formed in the side walls 36 and 38 of the enclosure 24 for providing a gliding and unimpinged reciprocating motion to the carriage 28.

FIG. 4 is a perspective view of the lift platform 32 in the deployed position. The lift platform 32 as shown is substantially rectangular in shape and includes a lift deck 60 for supporting a passenger to be lifted, and side curbs 64A and 64B disposed longitudinally along opposite sides of the lift deck 60. The lift platform 32 also includes side attachment brackets 68A and 68B positioned proximal to the outboard end 70 of the lift platform 32, and coupled to the outward facing surfaces of the side curbs 64A and 64B by welding or other conventional means. It will be appreciated that the lift platform 32 may include other components, some of which will be described in more detail below.

Figure 5:
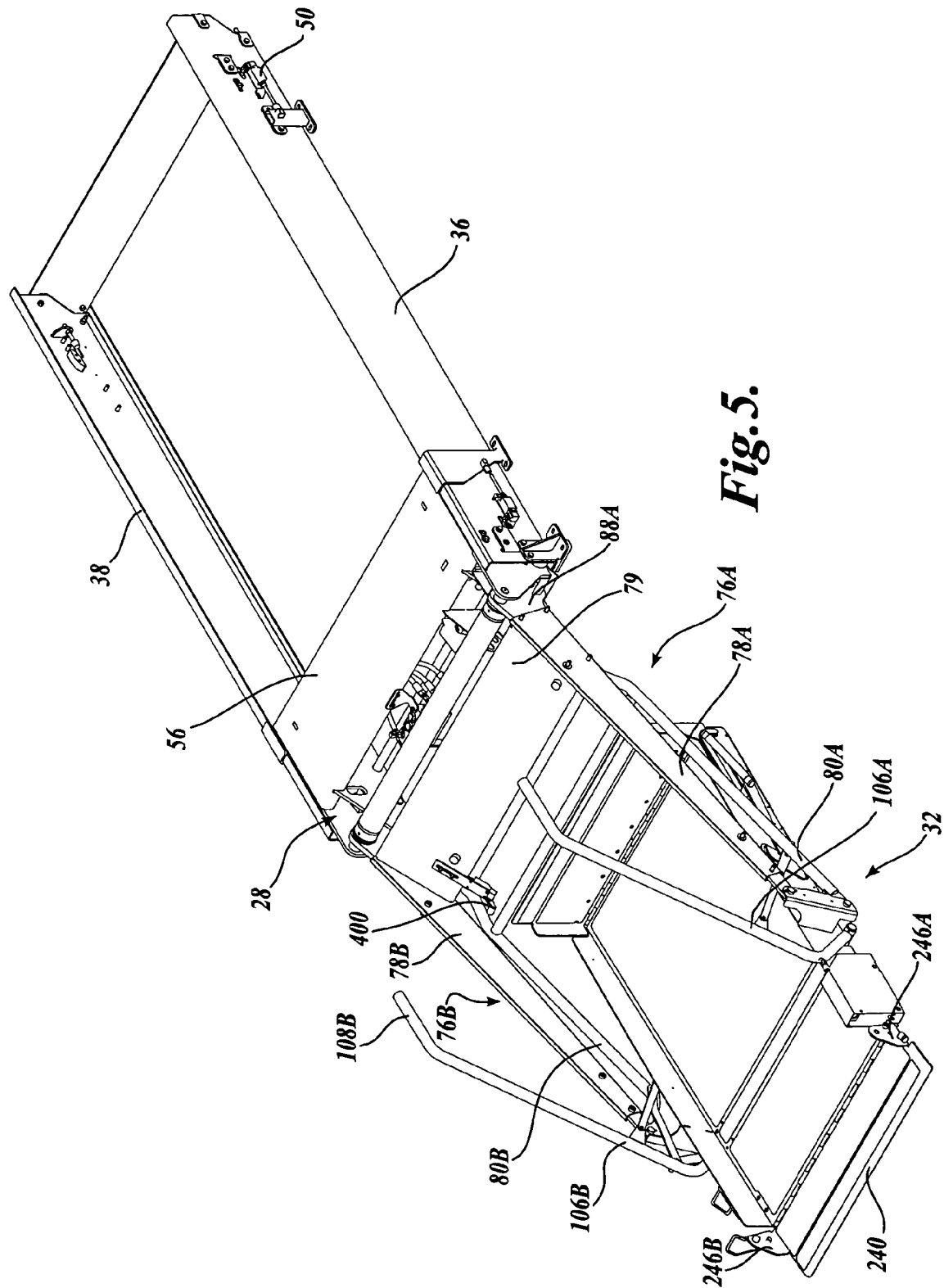
FIG. 5 is a side perspective view of the lift assembly depicting the lift platform in the lowered position.
Figure 6:
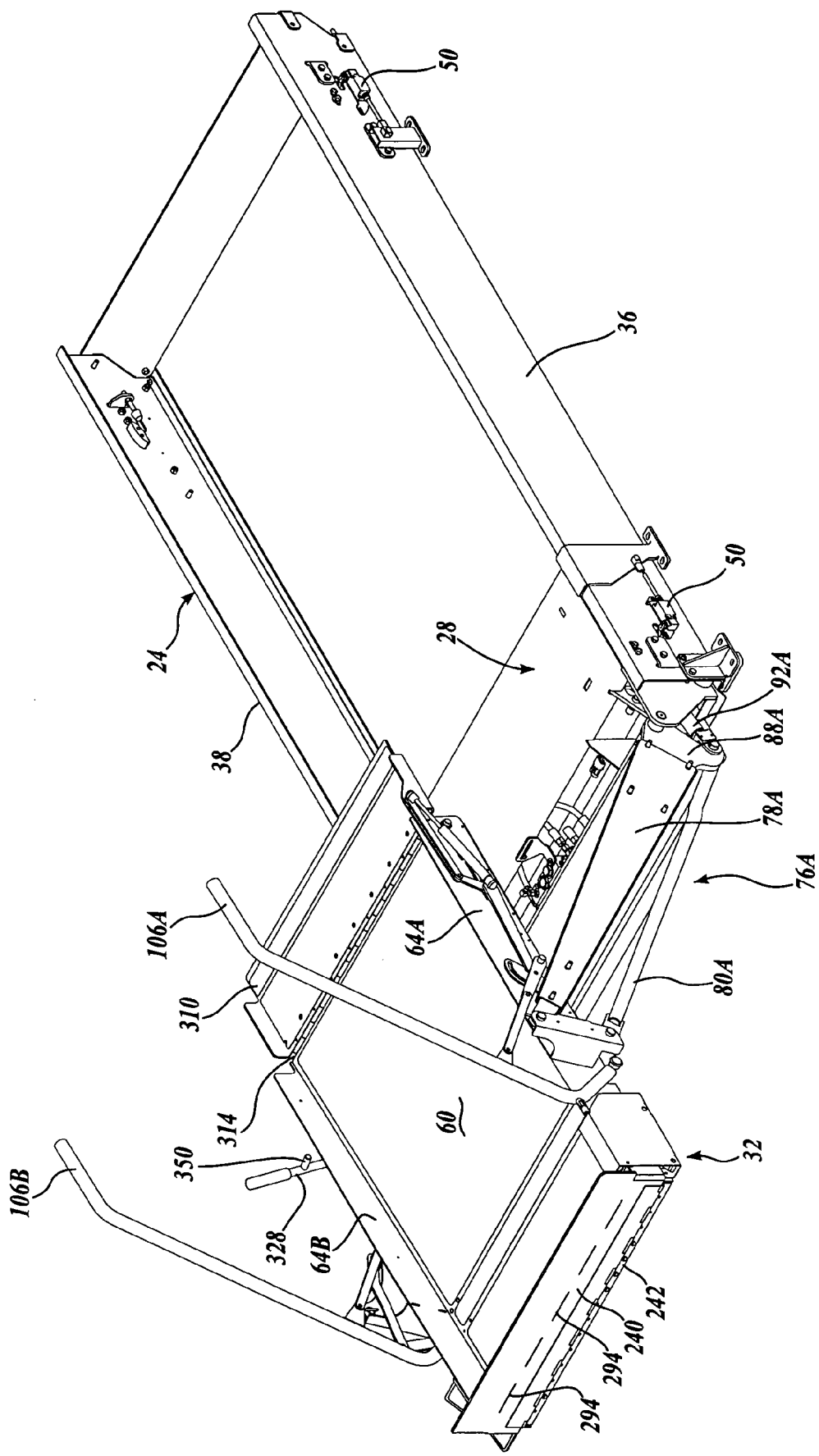
FIG. 6 is a side perspective view of the lift assembly depicting the lift platform in the raised position.
Figure 7:
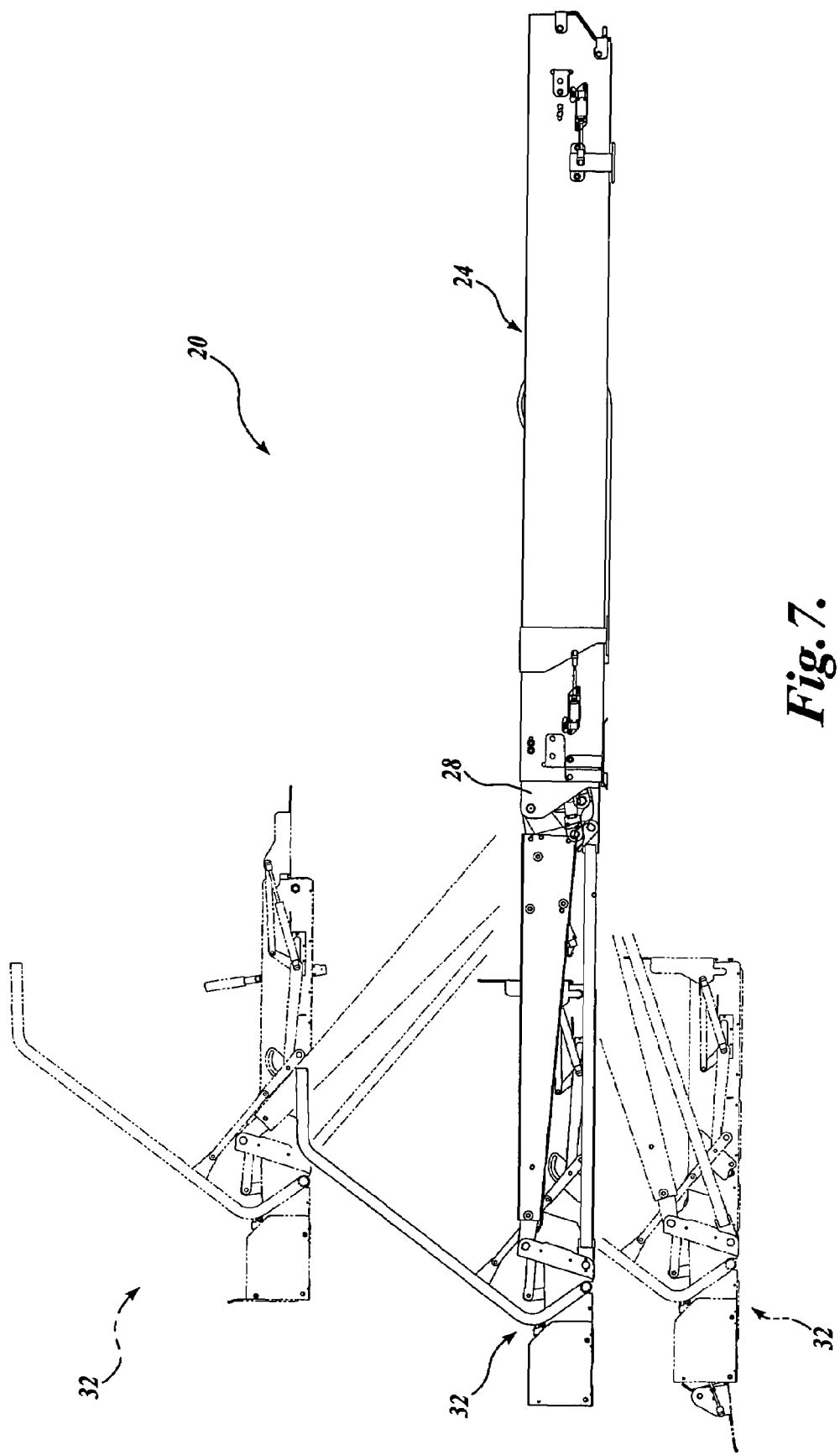
FIG. 7 is a side elevational view of the lift platform in the deployed position, and depicting the raised and lowered position of the lift platform shown in phantom.

Referring now to FIGS. 4-6, the lift platform 32 is pivotally mounted to the carriage 28 at its sides by a pair of spaced-apart parallel linkages 76A and 76B. The parallel linkages 76A and 76B include lifting arms 78A and 78B and stabilizing arms 80A and 80B, respectively. The stabilizing arms 80A and 80B at their inboard ends are rotatably mounted between a pair of outwardly extending supports 52A and 54A (hidden by the lifting arm 78A) of the carriage 28. The stabilizing arms 80A and 80B are disposed longitudinally outward from the supports 52A and 54A. As best shown in FIG. 4, the outboard ends of the stabilizing arms 80A and 80B are pivotally connected to the side attachment brackets 68A and 68B of the lift platform 32. The stabilizing arms 80A and 80B (stabilizing arm 80B is hidden in FIG. 4) function to maintain the lift platform 32 in a horizontal position at all times during stowage and operation. The lifting arms 78A and 78B at their inboard ends are secured to a tube 86, which is rotatably mounted between the carriage supports 52 and 54. The outboard ends of the lifting arms 78A and 78B are pivotally connected to the side attachment brackets 68A and 68B at a position above the connection of the stabilizing arms 80A and 80B. The lifting arms 78A and 78B provide the force for raising and lowering the lift platform 32, as will be described hereinafter.

As shown best in the FIG. 4, the inboard ends of the lifting arms 78A and 78B terminate as bell cranks 88A and 88B (bell crank 88B is hidden in FIG. 4). Piston rods 92A and 92B (piston rod 92B not shown in FIG. 4) of two hydraulic actuators (not shown) are connected to the bottoms of the bell cranks 88A and 88B, spaced from the pivoting connection of the tube 86. The hydraulic actuators are part of a second drive assembly 96 (shown schematically in FIG. 17), which includes a motorized or powered pump, a fluid reservoir, supply conduits and control valves conventionally connected and operated to extend and retract the piston rods 92A and 92B. One example of the second drive assembly that may be practiced with the present invention is disclosed in U.S. Pat. No. 5,110,252, the disclosure of which is incorporated by reference. While hydraulic actuators have been described, other actuators, such as pneumatic, could be used as could electric motors and transmission arrangements listed above with respect to the first drive assembly.

In operation, as the piston rods 92A and 92B are extended, the bell cranks 88A and 88B rotate in one direction about the longitudinal axis of the tube 86. This causes the lifting arms 78A and 78B to raise the lift platform 32 to the bus floor or raised position, as shown best in FIG. 6. As the piston rods 92A and 92B of the actuators are retracted, the bell cranks 88A and 88B rotate in the opposite direction to lower the lift platform 32, first to the level of the compartment floor, and then to ground level or lowered position, as shown in FIG. 5.

In accordance with aspects of the present invention, the lift platform 32 may be equipped with one or more safety features, such as a ramp barrier, a bridge barrier, a pair of handrails, or combinations thereof, for providing protection and a sense of security for a passenger while on the lift platform. Turning now to FIG. 6, each of aforementioned safety features will be described in greater detail. The first safety feature of the lift platform may include a pair of handrails 106A and 106B mounted to the lift platform 32. A pair of such handrails 106A and 106B extend upwardly on opposite sides of the lift platform 32, adjacent the side curbs 64A and 64B.

As was briefly described above, one aspect of the present invention is to provide a lift assembly that may be stowed within a compact enclosure. The term "compact" as used herein refers to a height of the enclosure that allows space between the top surface of the enclosure and the ceiling of the compartment when mounted therein. Such heights may range from approximately 6 inches to approximately 24 inches. To that end, for permitting the enclosure to be of a compact size, several components of the lift, including the handrails, may be retracted in the stowed position. Specifically, as shown in FIG. 3, the handrails 106A and 106B, when retracted, are substantially parallel with the lift deck 60 to reduce the effective height of the lift platform. As such, once the carriage 28, and thus, the lift platform 32 is in the deployed position, the handrails 106A and 106B may be moved from their retracted positions when stowed, to an extended position, as best shown in FIG. 4.

In the embodiment shown in the FIGURES, to provide for the retraction and extension positions, the handrails 106A and 106B are pivotally mounted to the lift platform 32 for movement between the extended position, shown in FIG. 4, and the retracted position, wherein they extend substantially parallel with the lift deck 60, shown best in FIG. 3. As will be described in more detail below, handrail lock assemblies may be included to lock the handrails in the extended position from the time after the lift platform 32 has been actuated to the deployed position until the lift platform 32 is ready to be stowed.

Figure 8A:
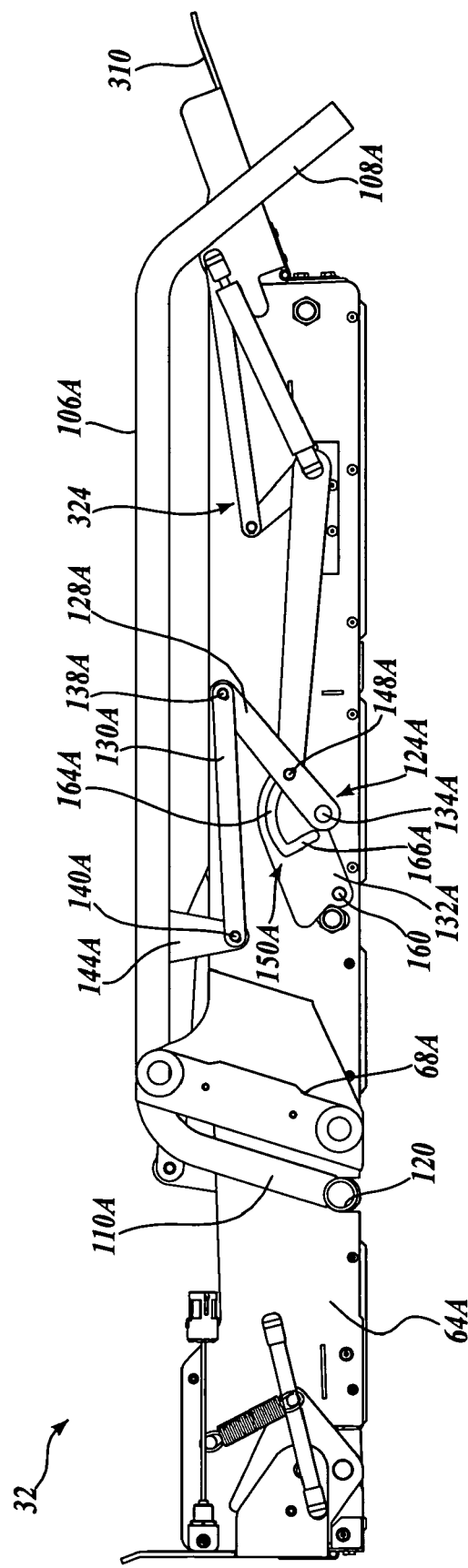
FIG. 8A is a side elevational view of the lift platform, wherein the handrails are disposed in the retracted position.
Figure 8B:
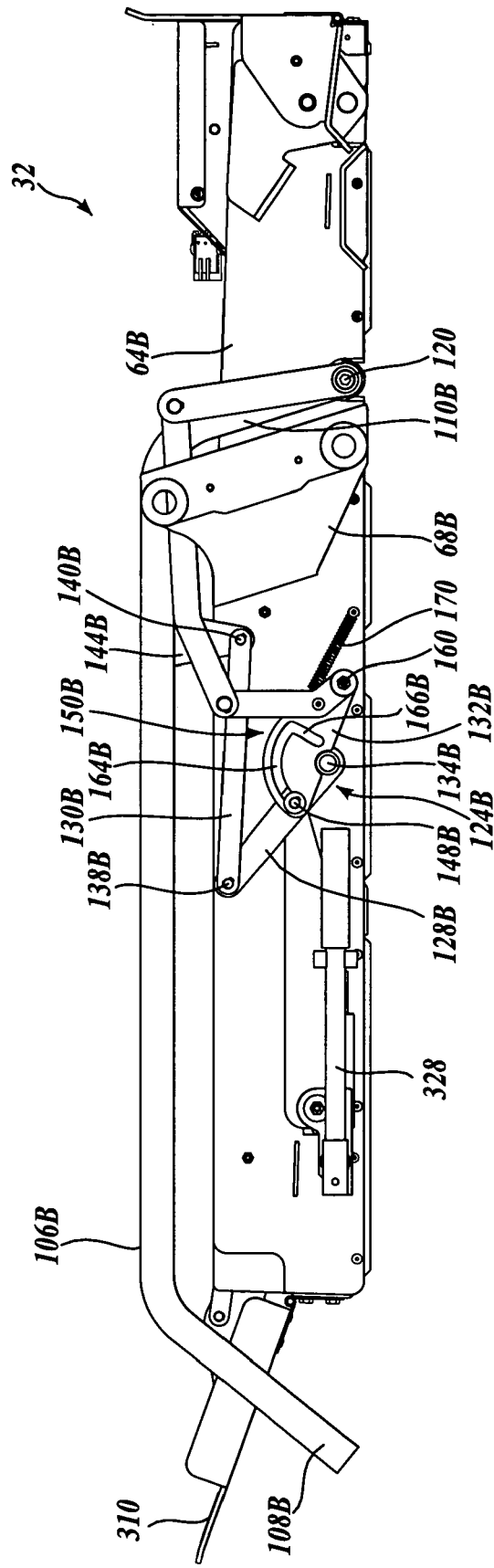
FIG. 8B is a side elevational view of the lift platform taken from the side opposite of FIG. 8A, wherein the handrails are disposed in the retracted position.

Referring now to FIGS. 8A and 8B, there are shown a pair of handrails 106A and 106B pivotally connected to the sides of the lift platform 32. The handrails 106A and 106B are preferably tubular in shape and are configured with bent end sections 108A and 110A and 108B and 110B, respectively, so that the handrails 106A and 106B are functional when extended, but retain a low profile when retracted. The bent sections 110A and 110B of the handrails 106A and 106B are fixedly interconnected by a common handrail torque shaft 120 that may be journaled by the side curbs 64A and 64B. Thus, the handrails 106A and 106B rotate together about a fixed pivot axis formed by the torque shaft 120, and as such, the driver or operator only needs to raise one of the handrails 106A or 106B to effect movement of the other handrail. As can be seen in FIGS. 8A and 8B, the handrail torque shaft 120 extends outward through the side curbs adjacent the side attachment brackets 68A and 68B.

As was briefly described above, the lift platform 32 may include handrail lock assemblies 124A and 124B in order to prevent the handrails 106A and 106B from pivoting to the retracted position once they have attained the extended position absent operator action. In the embodiment shown, the handrail lock assemblies 124A and 124B are linkage arrangements that include ground links 128A and 128B, handrail coupler links 130A and 130B, and handrail latches 132A and 132B, respectively. The lock-out assemblies begin with the ground links 128A and 128B rotatably attached at their lower ends to fixed frame pins 134A and 134B, respectively. The opposite ends of the ground links 128A and 128B are rotatably attached to the ends of the handrail coupler links 130A and 130B at pivot pins 138A and 138B. The opposite ends of the handrail coupler links 130A and 130B are rotatably attached at pivot pins 140A and 140B to hand rail flanges 144A and 144B, respectively, which are fixedly attached and extend from the lower portions of the handrails 106A and 106B. The ground links 128A and 128B further include slot pins 148A and 148B connected at approximately their mid-region. The slot pins 148A and 148B extend outward from the ground links 128A and 128B and are configured to be captured within slots 150A and 150B of the handrail latches 132A and 132B.

The handrail latches 132A and 132B are somewhat semi-circular in shape. The handrail latch 132A is fixedly connected at one corner to a latch torque shaft 160 for rotation therewith. The handrail latch 132B is attached to the opposite end of latch torque shaft 160. The latch torque shaft 160 is journaled by the side curbs 64A and 64B, and extends underneath the lift deck. Thus, the handrail latches 132A and 132B rotate together about an axis of the torque shaft 160. The handrail latches 132A and 132B include slots 150A and 150B, having arcuate shaped sections 164A and 164B connected at their outboard ends to substantially linear sections 166A and 166B, respectively. The slots 150A and 150B are sized such that the slot pins 148A and 148B are slidably retained therein. The handrail latches 132A and 132B may be biased to rotate toward the outboard ramp barrier by a spring 170 having one end connected directly to the handrail latch 132B and the other end connected to a fixed frame lug. It will be appreciated that the slots 150A and 150B maintain the position of the slot pins 148A and 148B, which in turn, control the rotation of the ground links 128A and 128B. As will be described in more detail below, the handrail latches 132A and 132B provide, in part, a locking mechanism for locking the handrails 106A and 106B in the extended position.

Figure 9A:
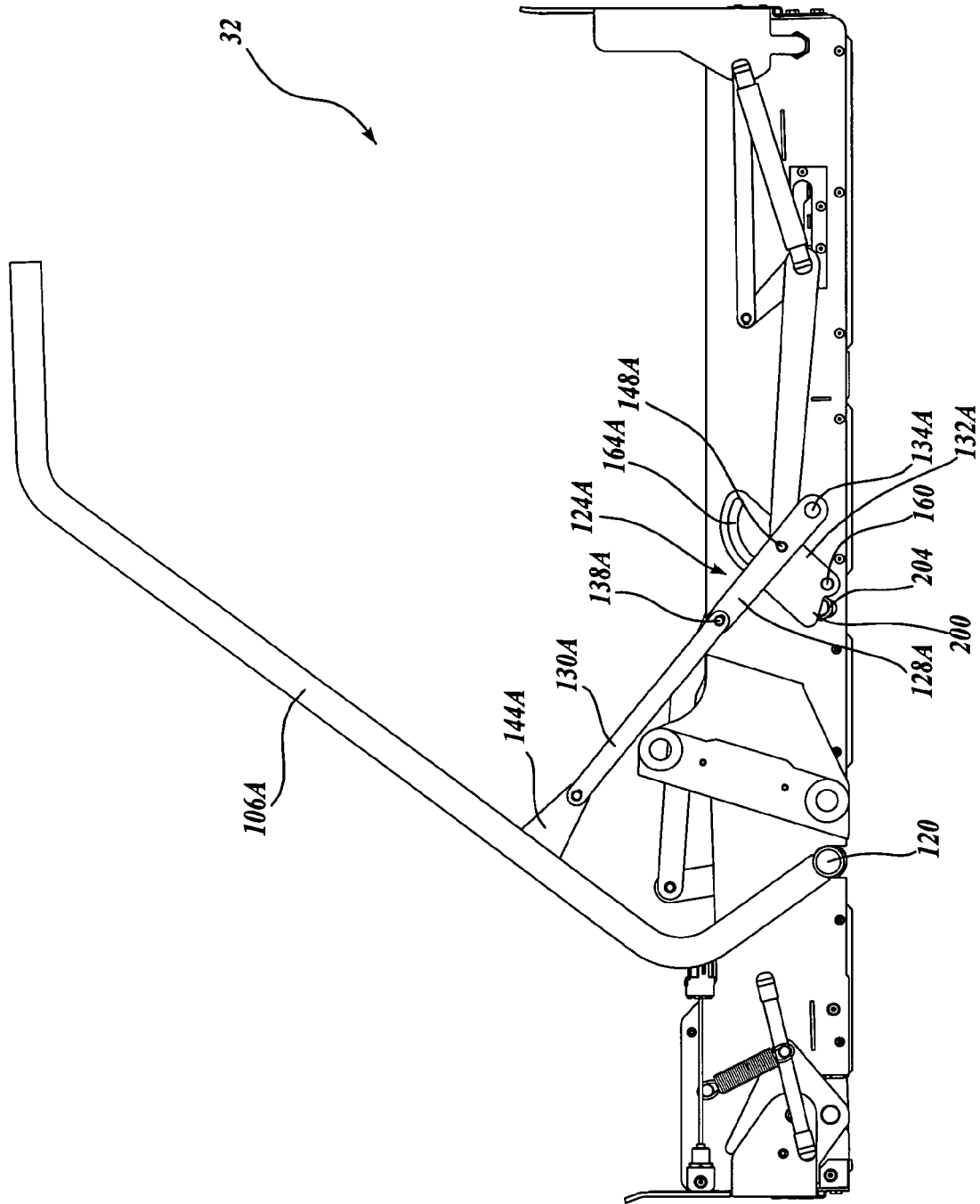
FIG. 9A is a side elevational view of the lift platform, wherein the handrails are disposed in the extended position.
Figure 9B:
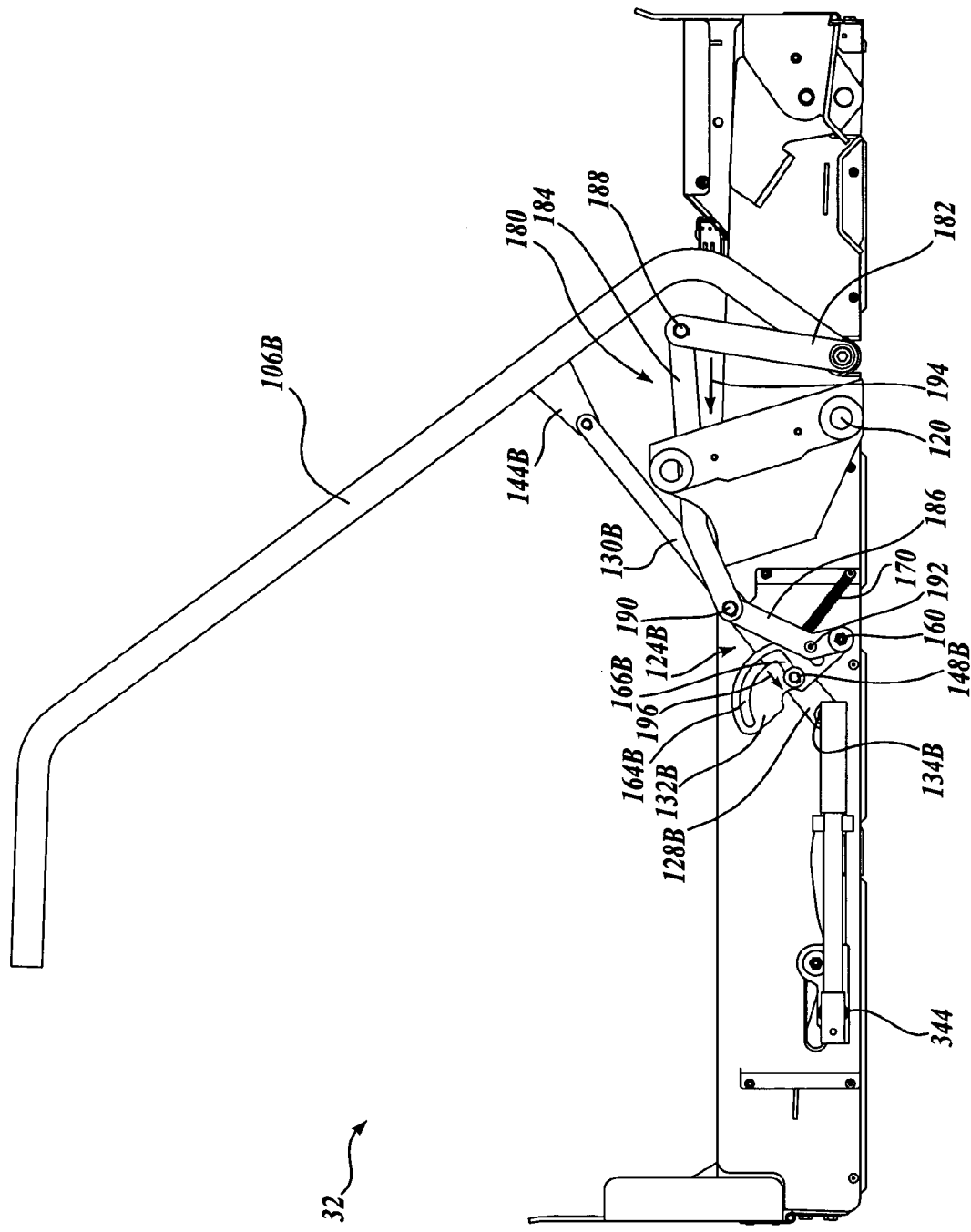
FIG. 9B is a side elevational view of the lift platform taken from the side opposite of FIG. 9A, wherein the handrails are disposed in the extended position.

In operation, when the handrails 106A and 106B are moved from their retracted position shown in FIGS. 8A and 8B, to their extended positions shown in FIGS. 9A and 9B, several movements of the links of the lock assemblies 124A and 124B simultaneously occur. When the operator grabs one of the handrails 106A or 106B and rotates the handrail toward the outboard end, both of the handrails 106A and 106B rotate due to their interconnection by the torque shaft 120. As the handrails 106A and 106B rotate, the handrail coupler links 130A and 130B translate toward the outboard end and rotate upwardly about pivot pins 138A and 138B due to their connection to the handrails 106A and 106B through handrail flanges 144A and 144B. This movement, in turn, rotates the ground links 128A and 128B about pivot pins 134A and 134B from a position angled toward the inboard end of the lift platform to a position angled toward the outboard end of the lift platform. At the same time the ground links 128A and 128B rotate, the slot pins 148A and 148B slide from the inboard end of the arcuate sections 164A and 164B of slots 150A and 150B to the outboard end of the arcuate sections 164A and 164B of the slots 150A and 150B. Once the slot pins 148A and 148B reach the outboard ends of the arcuate sections 164A and 164B, the handrail latches 132A and 132B rotate due to the biasing force of the spring 170, causing the slot pins 148A and 148B to translate into the substantially linear sections 166A and 166B. As such, the handrails 106A and 106B are locked in the extended position, due to the substantial alignment of the links, and by the handrail latches 132A and 132B restricting the rotation of the ground links 128A and 128B due to the contact between the slot pins 148A and 148B and the inboard surfaces of the substantially linear slots 166A and 166B.

To retract the handrails 106A and 106B once they are locked in the extended position, a handrail release mechanism 180 is provided on one side of the lift platform 32. As best shown in FIG. 9B, the handrail release mechanism 180 includes an base link 182, a latch release link 184, and an end link 186. The handrail release mechanism 180 begins with an base link 182 having its lower end rotatably connected to the torque shaft 120 so that it rotates independently from the handrail 106B. The upper end of the base link 182 is rotatably connected to one end of the latch release link 184 by a pivot pin 188. In the embodiment shown, the pivot pin 188 is elongated to form a handle sized to be grasped by the operator. The opposite end of the latch release link 184 is rotatably attached to the upper end of the end link 186 by a pivot pin 190. The lower end of the end link 186 is keyed to the torque shaft 160. The end link 186 is further coupled to the handrail latch 132B by a fastener, such as screw 192, such that the handrail latch 132B and the end link 186 rotate simultaneously.

In operation, to unlock the handrails 106A and 106B so that the handrails may rotate to the retracted position, the operator grasps the handle formed by the extended portion of pivot pin 188, and applies a force in the direction of the arrow 194 to rotate the base link 182 about the torque shaft 120. As the base link 182 rotates, the latch release link 184 translates in the inboard direction, which in turn, causes the end link 186 to rotate the torque shaft 160. When the end link 186 rotates, the handrail latch 132B rotates against the biasing force of the spring 170 due to the connection between the end link and the handrail latch. As the handrail latch 132B rotates, the substantially linear section 166B slides along slot pin 148B in the direction of arrow 196. Once the latch 132B has achieved this position, links 130A and 130B, and 128A and 128B are no longer substantially aligned, and the slot pin 148B is allowed to slide within the arcuate section of the slot 164B, which permits the ground link 128B to rotate, and thus, permits the lock-out assembly 124B to collapse into the retracted position. Due to the shaft 160, the latch 132A rotates simultaneously with the handrail latch 132B, allowing the slot pin 148A to move and the links of the lock assembly 124A to collapse.

In addition to mechanically locking the handrails into the extended position, the lift assembly may include a first electrical disabler that prevents raising and lowering of the lift platform when the handrails are not locked into the extended position. In one embodiment of the present invention shown in FIG. 9A, the first electrical disabler is a target plate 200 integrally formed with the handrail latch 132A and a proximity sensor 204 mounted to the side of the lift platform. As the handrail latch 132A rotates about the shaft 160 when the handrails 106A and 106B are moved to the extended position, the target plate 200 of the handrail latch 132A, moves downward in front of the electronic proximity sensor 204. When the sensor 204 senses the target plate 200, it provides a signal to the control system indicating that the handrails 106A and 106B are locked in the extended position. As long as the control system receives a signal indicating that the handrails are locked in the extended position, the control system is permitted to raise and lower the lift platform 32. If the control system receives a signal indicating that the handrails are not locked in the extended position, it electronically prevents the control system from raising or lowering the lift platform.

Referring again to FIG. 6, the lift platform 32 may also include other safety features, such as the ramp barrier 240. The inboard edge of the ramp barrier 240 is hingedly connected to the outboard edge of the lift deck 60 over its width by a hinge 242. The ramp barrier 240 rotates about the hinge 242 between an upright, barrier position, shown in FIG. 6, and an extended, ramp position shown in FIG. 5. The ramp barrier 240 includes side flanges 246A and 246B integrally formed at the sides of the ramp barrier 240, as best shown on FIG. 5. The side flanges 246A and 246B are disposed orthogonal to the ramp barrier 240 and overlap the side curbs 64A and 64B in the barrier position. In its fully upright, barrier position shown in FIG. 6, the ramp barrier 240 may prevent a wheelchair from moving off the outer edge of the lift platform 32. In its fully extended, ramp position, the ramp barrier 240 forms a ramp between the lift deck and the ground surface so that a wheelchair may enter the lift platform. The ramp barrier 240 is actuated between such positions by a manually operated foot pedal mechanism. As will be described in more detail below, the foot pedal arrangement includes a deploy pedal for deploying the ramp barrier to the ramp position and a stow pedal for stowing the ramp barrier to the barrier position.

Figure 10A:
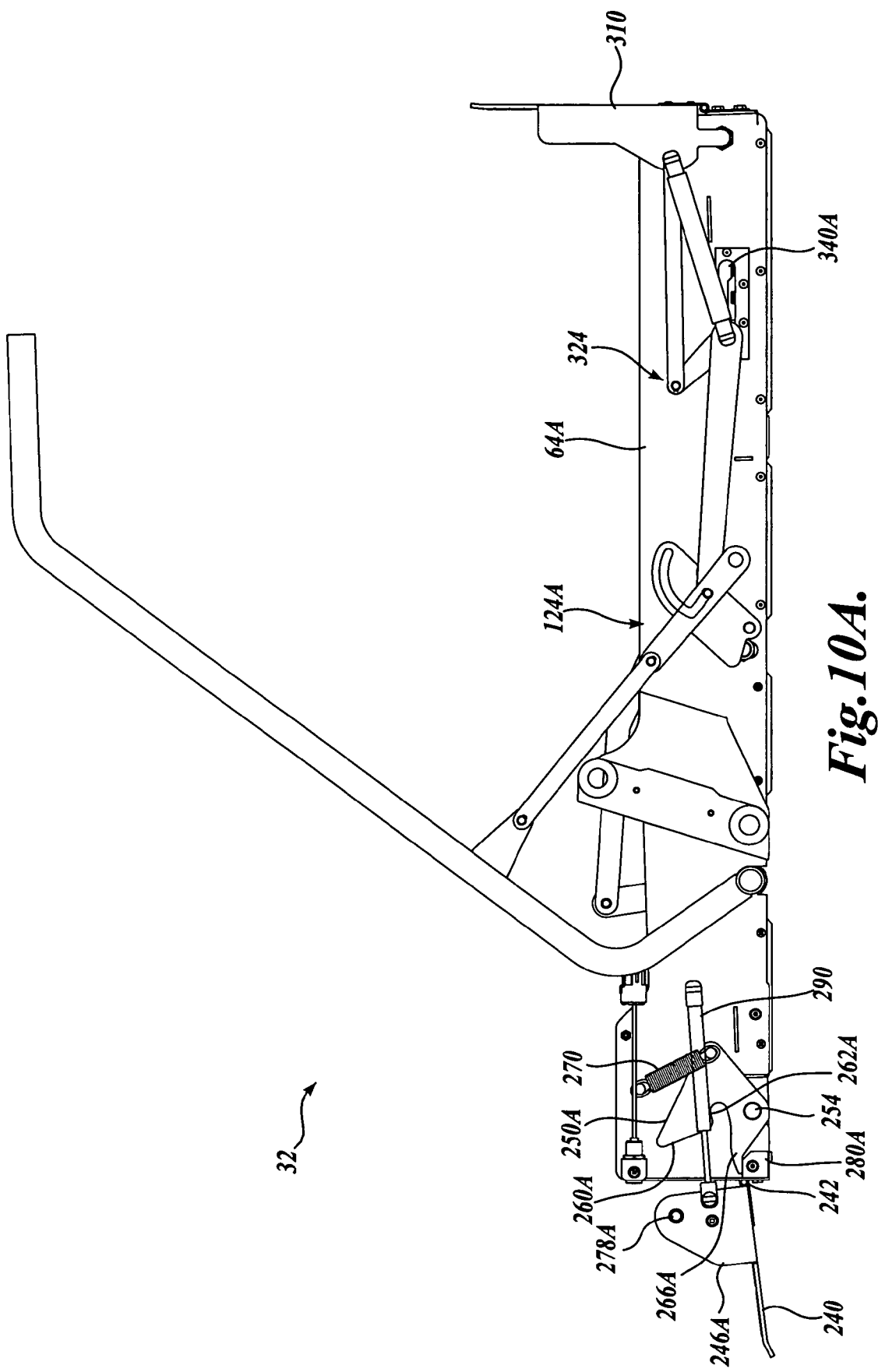
FIG. 10A is a side elevational view of the lift platform, wherein the outboard ramp barrier has been rotated to the ramp position.
Figure 10B:
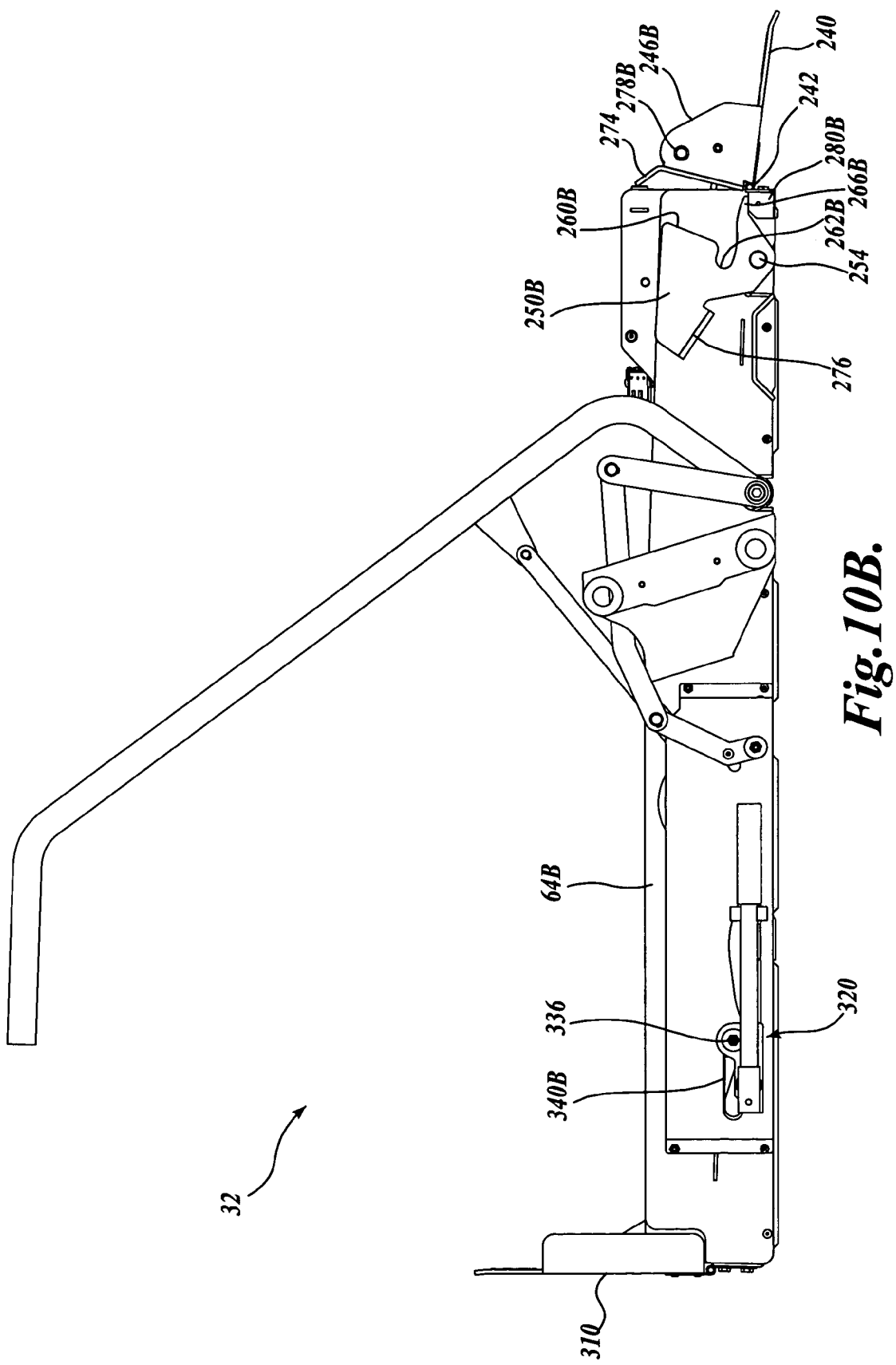
FIG. 10B is a side elevational view of the lift platform taken from the side opposite of FIG. 10A, wherein the outboard ramp barrier has been rotated to the ramp position.

FIGS. 10A and 10B are side elevational views taken from each side of the lift platform 32 with the ramp barrier in the ramp position. As best shown in FIGS. 10A and 10B, the foot pedal mechanism includes latches 250A and 250B disposed laterally along the sides of the side curbs 64A and 64B. The latches 250A and 250B are fixedly interconnected at their lower ends by a torque shaft 254 for rotation therewith. The torque shaft 254 is journaled by the side curbs 64A and 64B and by bearings 254A and 254B, and extends underneath the lift deck. Thus, the latches 250A and 250B rotate together about the axis defined by the torque shaft 254. The latches 250A and 250B are configured to form cam surface profiles for engagement with projection 278A and 278B secured to the side flanges 246A and 246B of the ramp barrier 240. The cam surface profiles include contact surfaces 260A and 260B and retaining surfaces 262A and 262B in the form of circular notches. The latches 250A and 250B further include engagement projections 266A and 266B that restrict the rotation of the latches 250A and 250B about the axis of the torque shaft 254. The latches 250A and 250B may be biased to rotate in the outboard direction by a spring 270 having one end connected directly to the latch 250A and the other end connected to a fixed frame lug.

Figure 13:
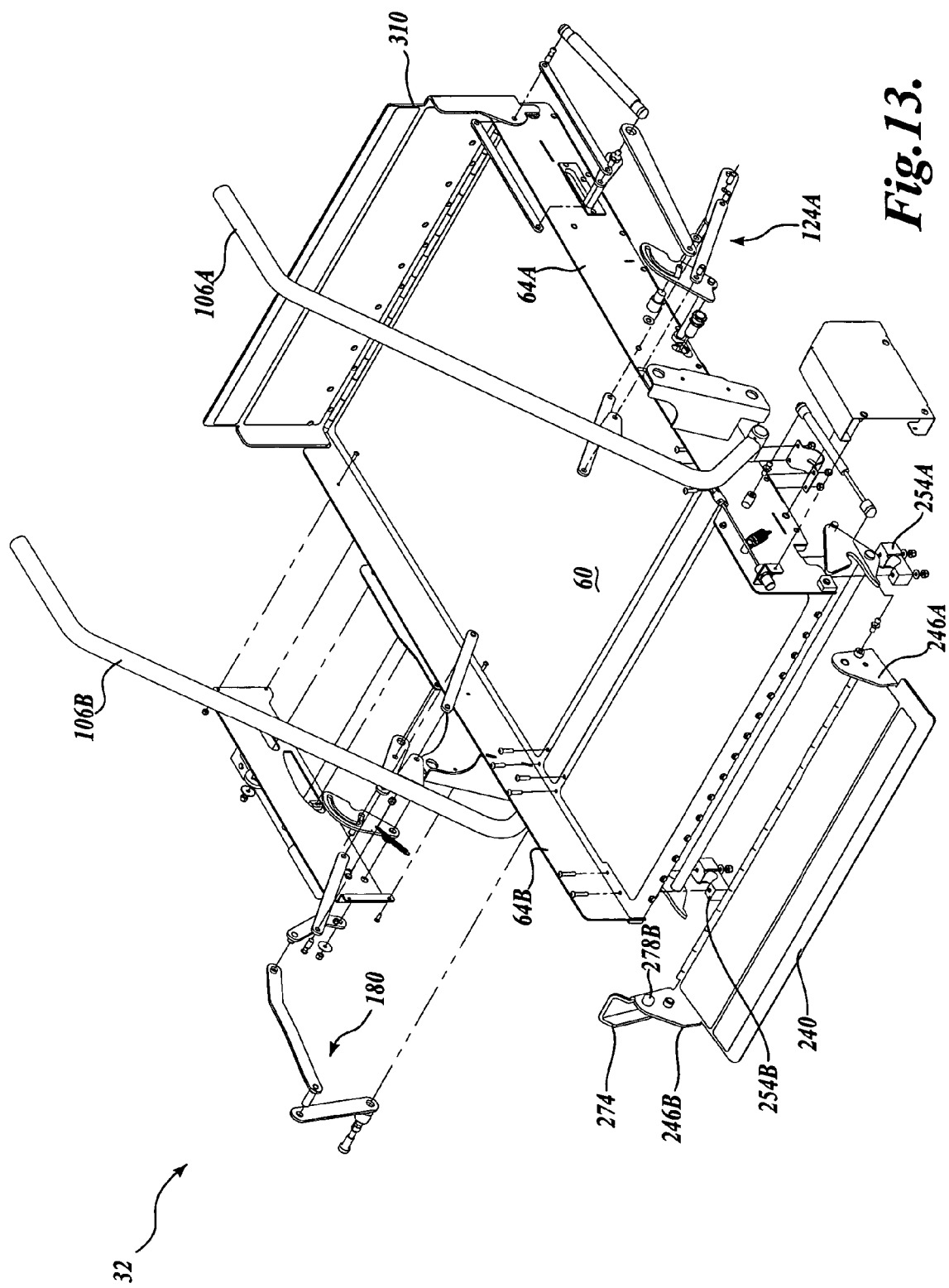
FIG. 13 is an exploded perspective view of the lift platform.
Figure 14:
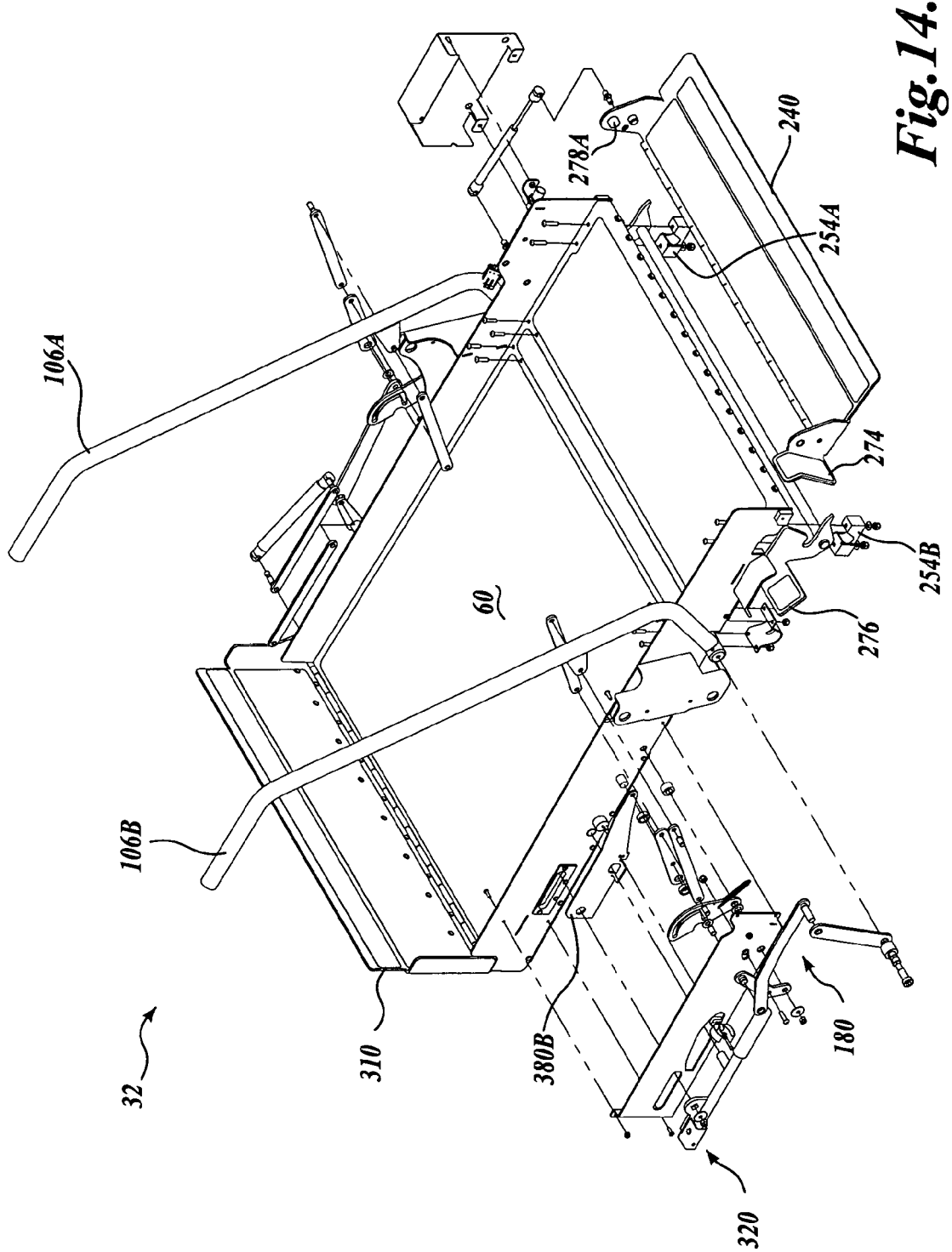
FIG. 14 is an exploded perspective view of the lift platform taken from the side opposite of FIG. 13.

As was briefly described above, the foot pedal mechanism further includes a stow pedal 274 and a deploy pedal 276, which are integrally formed with the ramp barrier side flange 246B and the latch 250B, respectively. The stow pedal 274 and the deploy pedal 276 extend substantially orthogonal to the side curb 64B. Projections 278A and 278B are affixed to the interior surfaces of side flanges 246A and 246B, respectively, as best shown in FIG. 13. The projections 278A and 278B are configured to engage with the cam surface profile to rotate and lock into the latches 250A and 250B at retaining surfaces 262A and 262B.

Figure 16A:
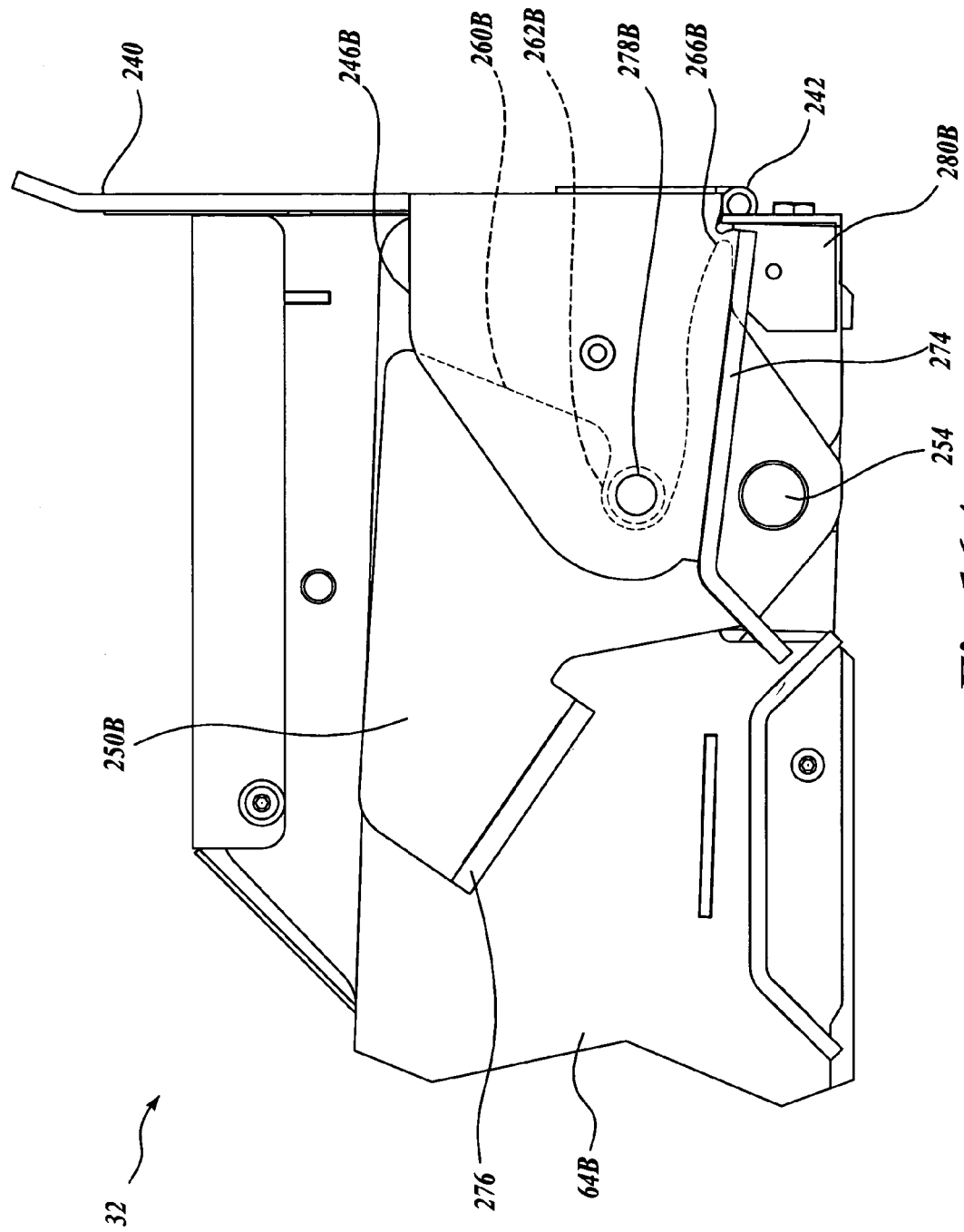
Figure 16B:
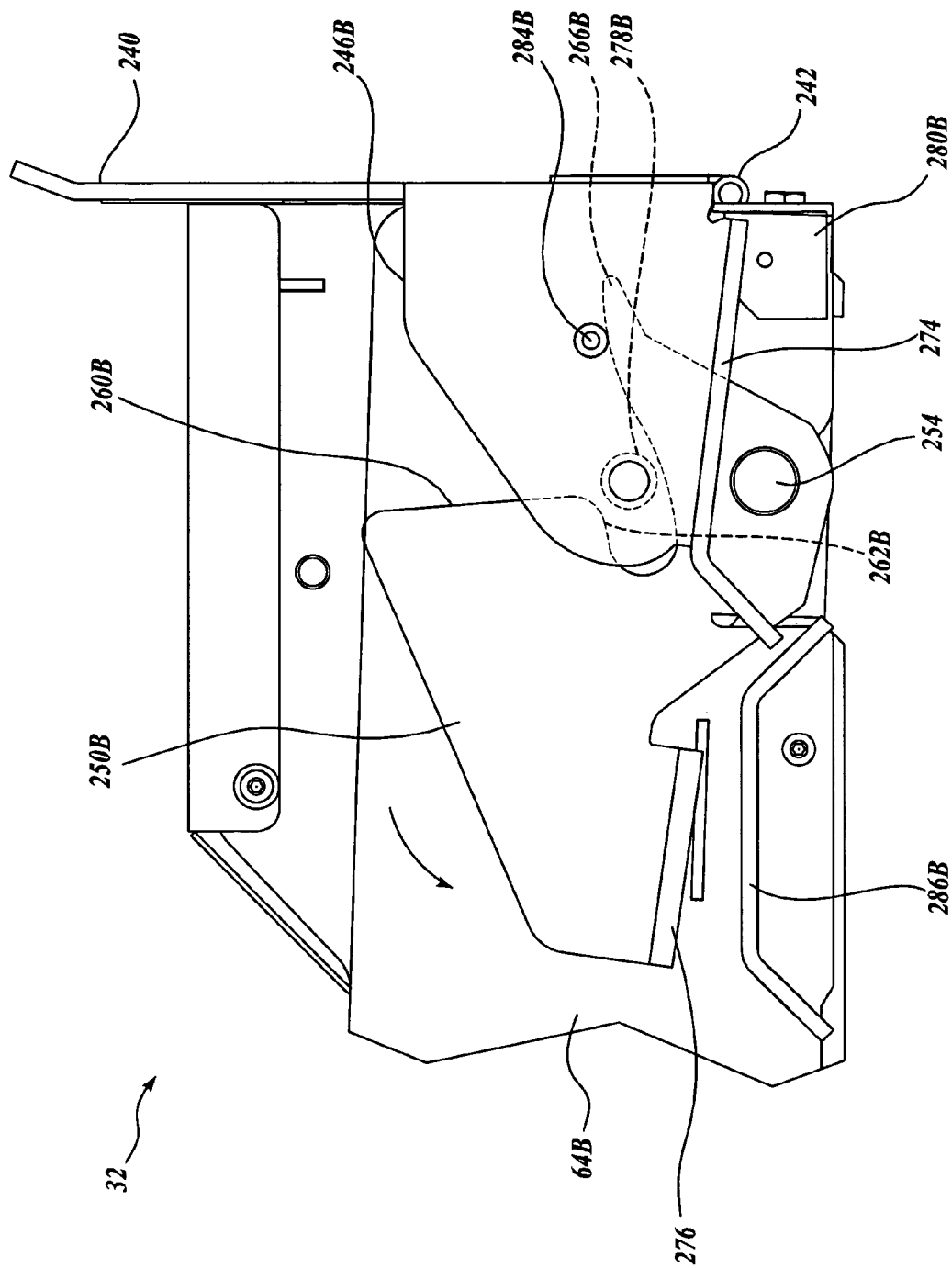
Figure 17:
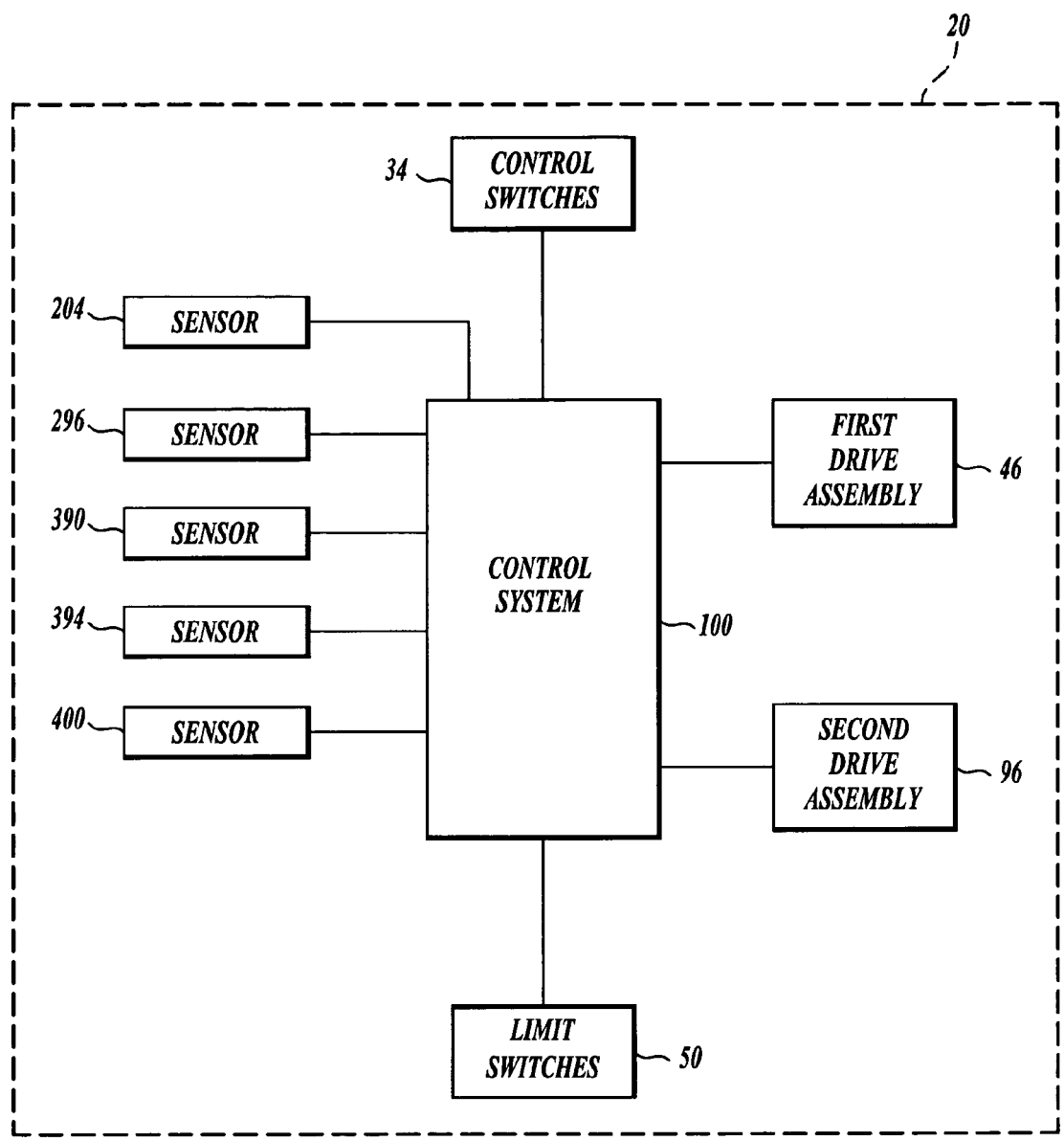
FIG. 17 is a block diagram of certain components of the lift assembly.

FIGS. 16A-16C are sequential partial side elevational views of the lift platform 32 depicting the ramp barrier 240 moving from the barrier position to the ramp position. As shown in FIG. 16A, the ramp barrier 240 is locked in the barrier position. For clarity in the following description, the movement of the latch 250B will be described; however, it will be appreciated that the movement of the latch 250A is substantially identical due to its connection with shaft 254. The biasing force of the spring 270 (see FIG. 10A) has rotated the latch 250B to the position shown, wherein the engagement projection 266B contacts a stop block 280B connected to the side curb 64B, and the side flange projection 278B is in abutment with the circular retaining surface 262B of the cam surface profile. The circular retaining surface 262B is configured such that when the ramp barrier is in the barrier position and the biasing force of the spring 270 has rotated the latches to a resting or start position, the upper portion of the retaining surface 262B forms a mechanical stop, thereby prohibiting outboard rotation of the ramp barrier 240 about the hinge 242.

To unlock the ramp barrier 240 so that the ramp barrier 240 may be actuated from the upright, barrier position to the extended, ramp position, a force is applied to the deploy pedal 276, such as stepping on the deploy pedal, which rotates the latch 250B (and 250A due to the shaft 254) in the inboard direction about shaft 254, to the position shown in FIG. 16B. In FIG. 16B, the latch 250B has rotated to an unlocked position, wherein the side flange projection 278B is free from contact with the cam surface profile, namely, the retaining surface 262B. This, in turn, allows the ramp barrier 240 to rotate outwardly on its own due to its center of gravity to the ramp position shown in FIG. 16C. As best shown in FIG. 16B, the ramp barrier 240 may include a second side flange projection 284B that functions as a mechanical "kick-off" to start movement of the ramp barrier 240. The lift platform 32 may include a mechanical stop in the form of shoulder plate 286B.

In the embodiment shown in FIG. 10A, an extension damper 290 may be provided to dampen the rotational movement of the ramp barrier 240. The extension damper 290 at one end is rotatably connected to a fixed frame pin and is rotatably attached to the side flange 246A at the other. Extension dampers of the type practiced by the present invention are well known, and thus, will not be described in any further detail.

Figure 15A:
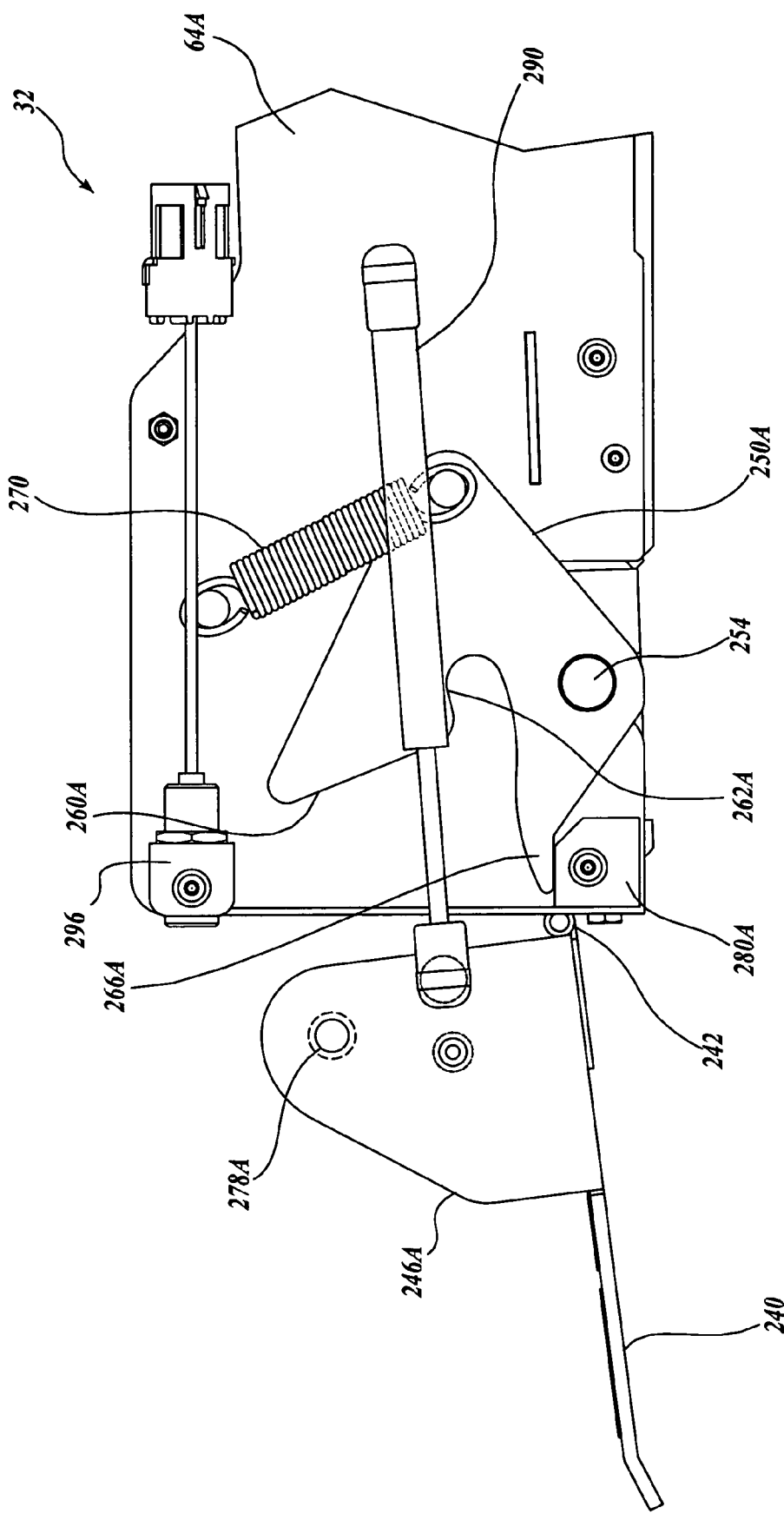
FIGS. 15A-15D are sequential partial side elevational views of the lift platform depicting the ramp barrier moving from the ramp position to the barrier position.

FIGS. 15A-15D are sequential partial side elevational views of the lift platform depicting the ramp barrier 240 moving from the ramp position to the barrier position. As shown in FIG. 15A, the ramp barrier 240 is extended in the ramp position. For clarity in the following description, the movement of the latch 250A will be described; however, it will be appreciated that the movement of the latch 250B is substantially identical due to its connection with shaft 254. The biasing force of the spring 270 has rotated the latch 250A to the position shown, wherein the engagement projection 266A contacts a stop block 280A connected to the side curb 64A.

Figure 15B:
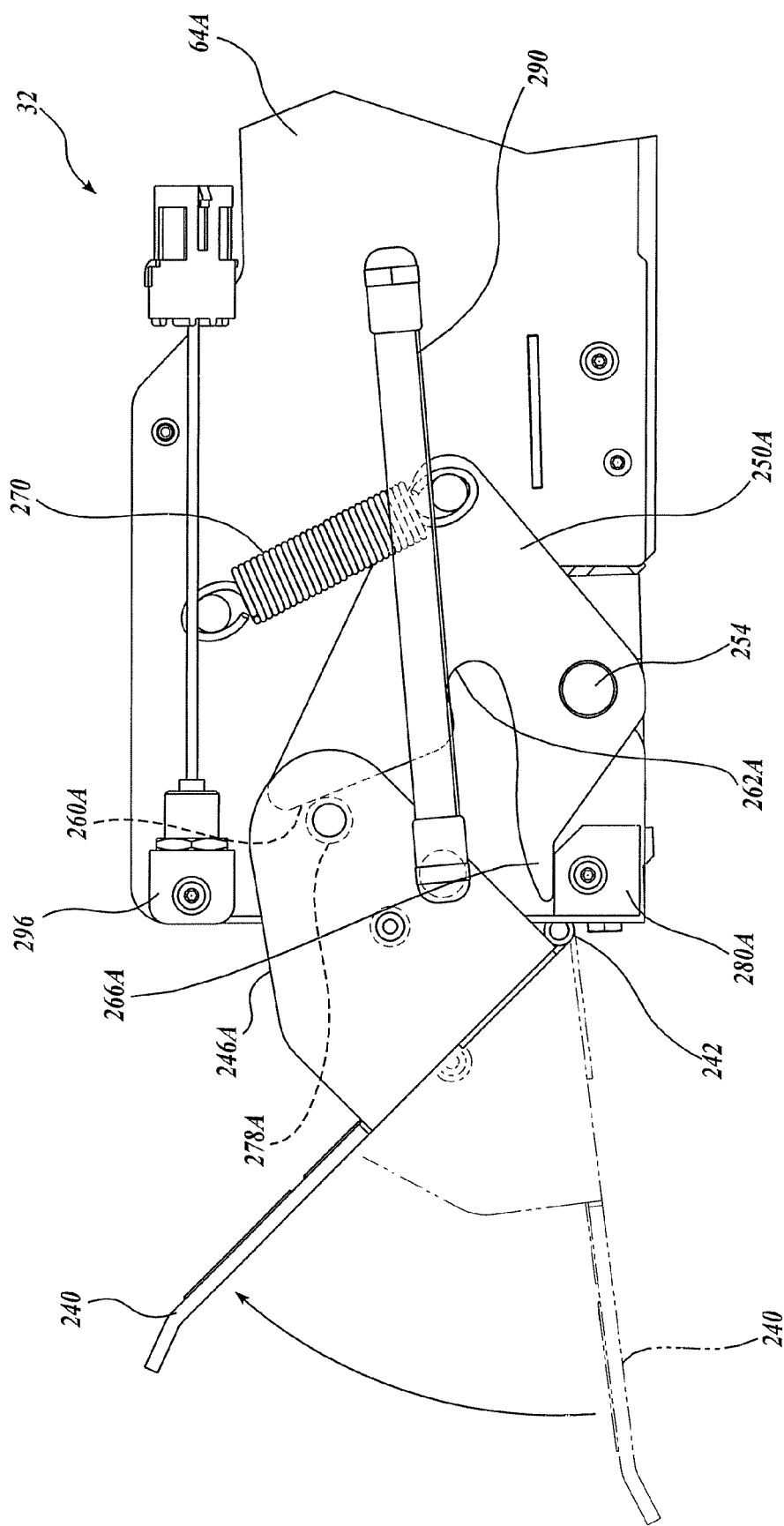
Figure 15C:
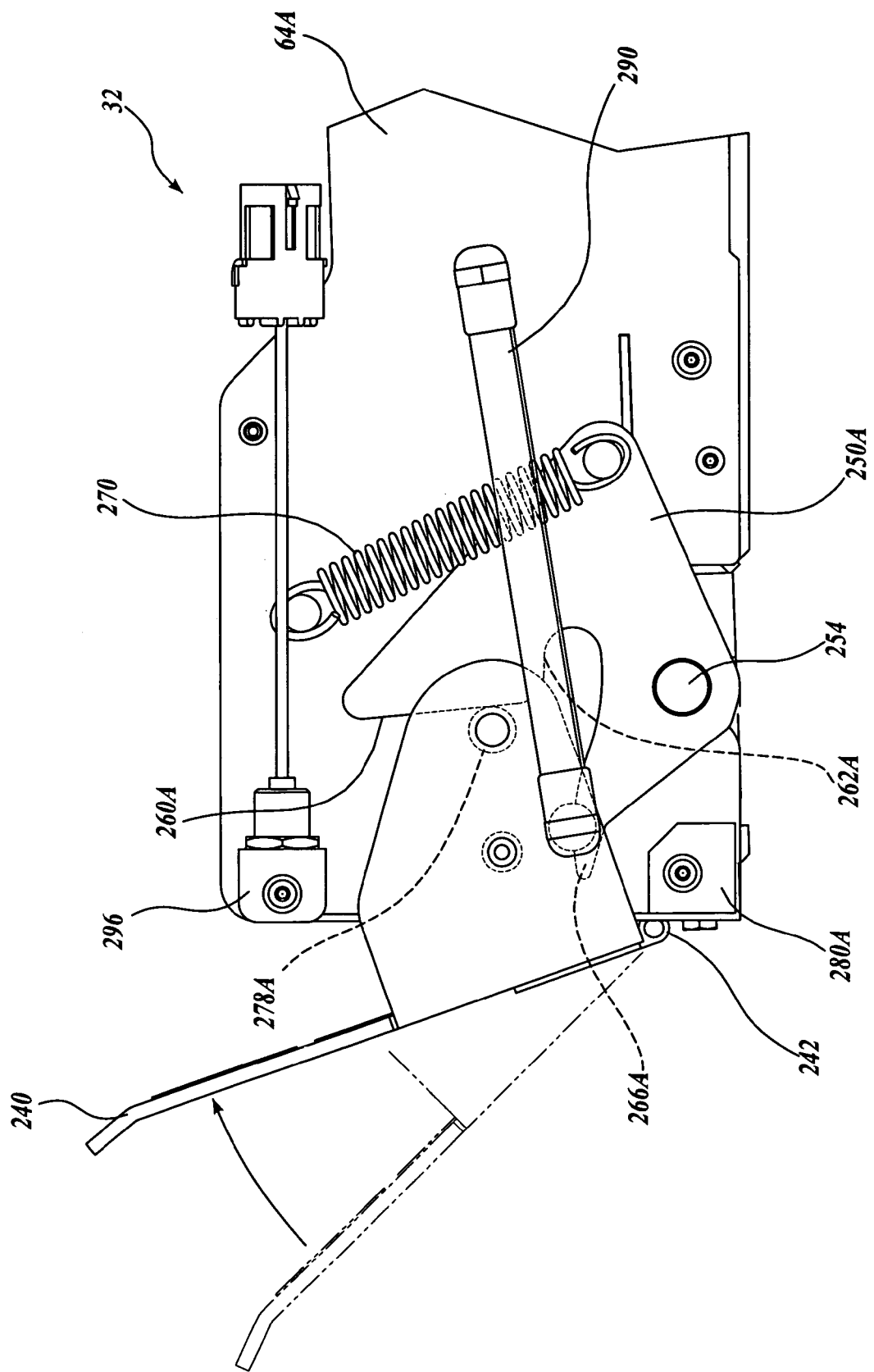
Figure 15D:
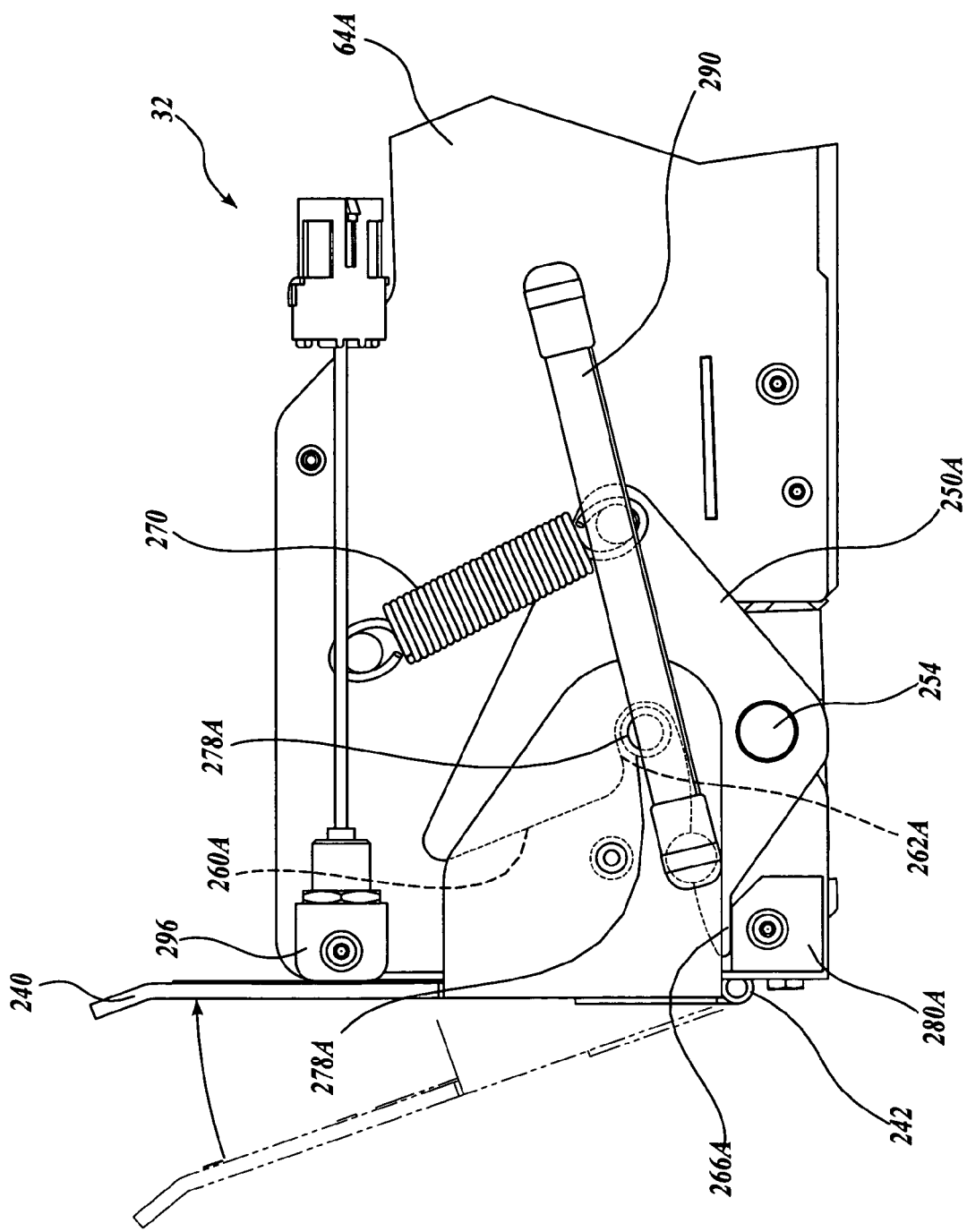

To actuate the ramp barrier 240 from the ramp position to the barrier position, a force is applied to the stow pedal 274 (see FIGS. 16A-16C), such as stepping on the stow pedal, which rotates the ramp barrier 240 about the hinge 242 first to the position shown in FIG. 15B. As shown in FIG. 15B, the side flange projection 278A is in abutment with the upper contact surface 260A of the cam surface profile, and the engagement projection 266A is in contact with the stop block 280A. As the ramp barrier 240 continues to rotate about the hinge 242 due the force applied to the stow pedal 274, the latch 250A rotates in the inboard direction about shaft 254 to the position shown in FIG. 15C, due to the force applied by the projection 278A to the contact surface 260A. As the latch 250A rotates to the position shown in FIG. 15C, the latch rotates against the biasing force of the spring 270. As the ramp barrier 240 continues to rotate to the position shown in FIG. 15D, the projection 278A rides past the upper contact surface 260A, causing the latch 250A to rotate in the outboard direction due to the biasing force of the spring 270, and returns the latch 250A to the resting or start position shown in FIG. 15D, thereby locking the ramp barrier 240 in the upright, barrier position.

The ramp barrier 240 in its upright, barrier position can also act as an energy-absorption, energy-dissipation safety barrier to absorb or dissipate some of the energy of an impact with a wheelchair located on the lift platform 32. In order to absorb and dissipate the energy of collision, the ramp barrier 240 includes spaced-apart slots 294 that are arranged along the upper portion of the ramp barrier, parallel to the hinge 242, as best shown in FIG. 6. The slots 294 provide an area of reduced rigidity so that the upper portion of the ramp barrier 240 yields along the axes of the slots 294 when impacted by a wheelchair. This allows the ramp barrier 240 to absorb and dissipate part of the energy of a collision between a wheelchair and the ramp barrier, thus helping to reduce any injury to the wheelchair occupant or damage to the lift assembly.

In addition to mechanically locking the ramp barrier 240 in the upright, barrier position, the lift platform 32 may include a second electrical disabler that prevents raising and lowering of the lift platform when the ramp barrier 240 is not locked in the upright, barrier position. In one embodiment of the present invention, the second electrical disabler is a proximity sensor 296 mounted to the side curb 64A of the lift platform 32 and aimed toward the ramp barrier 240 (See FIGS. 15A-15D). As the ramp barrier 240 rotates about the hinge 242 from the ramp position to the barrier position, the ramp barrier 240 acts as a target plate that moves in front of the electronic proximity sensor 296. When the sensor 296 senses the ramp barrier 240, it provides a signal to the control system indicating that the ramp barrier 240 is locked in the upright, barrier position. As long as the control system receives a signal indicating that the ramp barrier is locked in the barrier position, the control system is permitted to raise and lower the lift platform 32. If the control system receives a signal indicating that the ramp barrier is not in the upright position, for example, if the ramp barrier is still deployed or that the upper portion of the ramp barrier has been displaced due to an impact force of the wheelchair, it electronically prevents the control system from raising or lowering the lift platform.

Figure 11A:
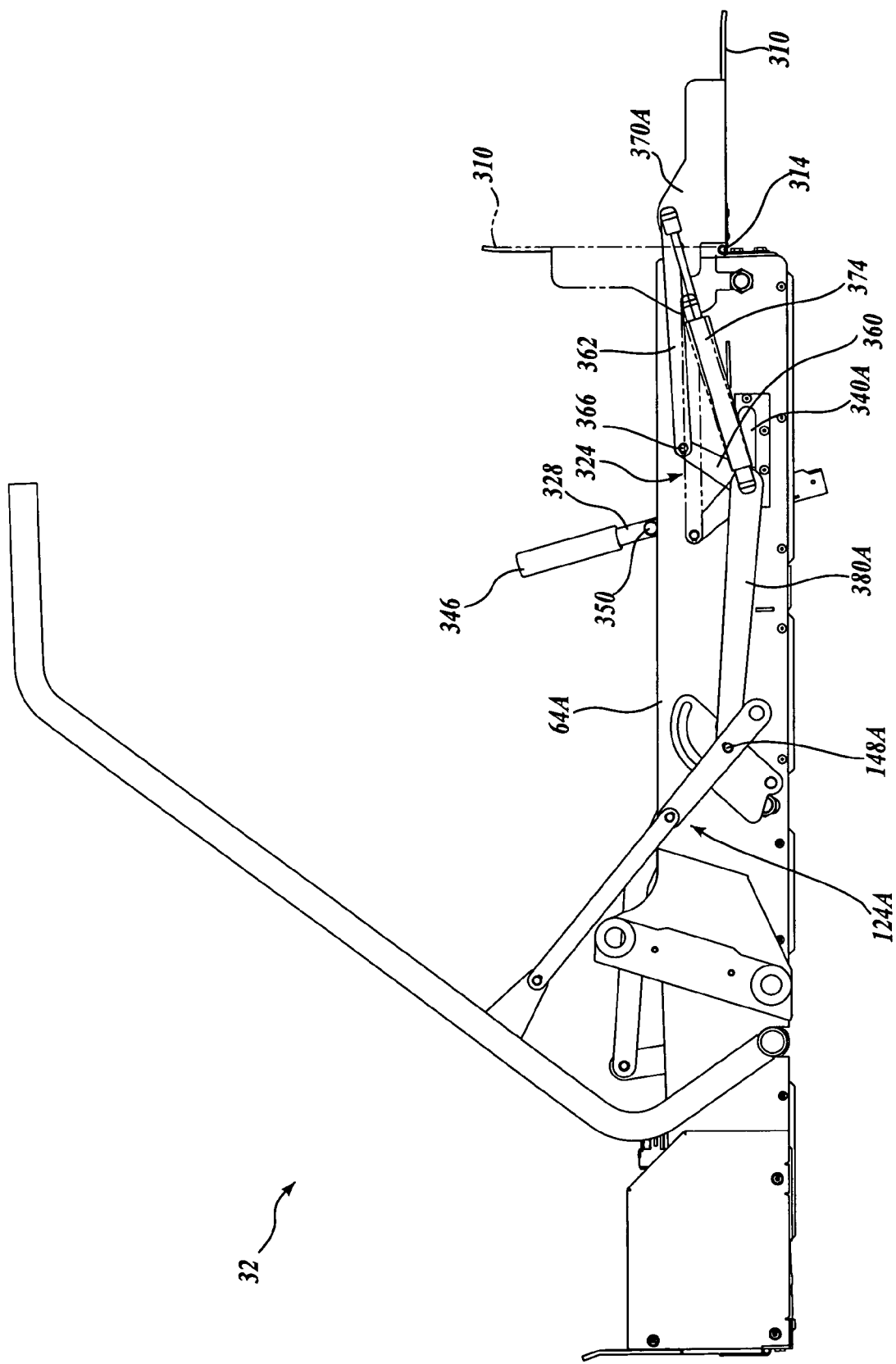
FIG. 11A is a side elevational view of the lift platform, wherein the inboard bridge barrier has been rotated to its bridge position.
Figure 11B:
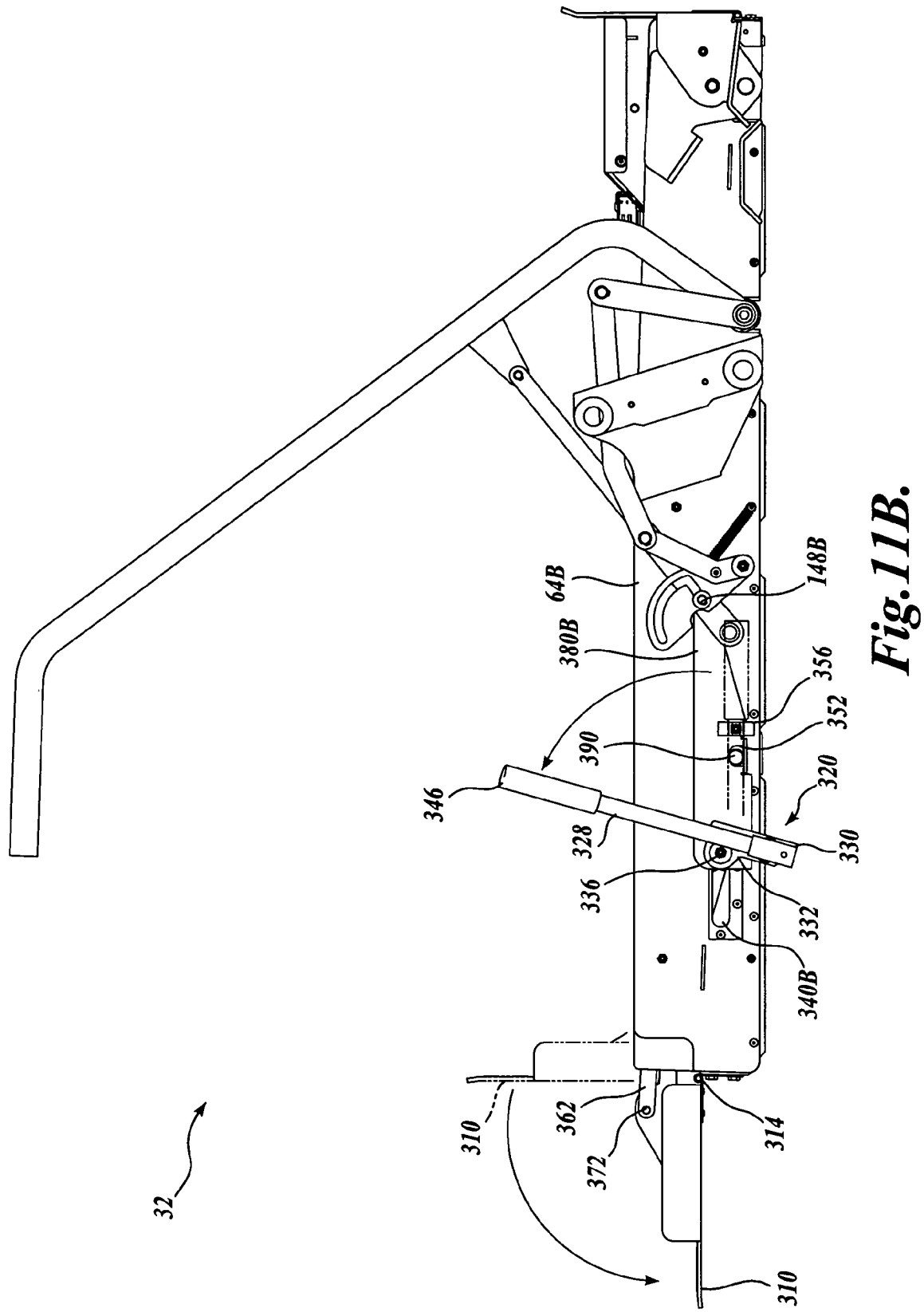
FIG. 11B is a side elevational view of the lift platform taken from the side opposite of FIG. 11A, wherein the inboard bridge barrier has been rotated to its bridge position.

Referring again to FIG. 6, the lift platform 32 may further include a bridge barrier 310 as another safety feature to aid in the protection of the wheelchaired passenger. The outboard edge of the bridge barrier 310 is rotatably mounted to the inboard edge of the lift deck 60 along its width using a hinge 314. As illustrated in FIGS. 3, 4, and 6, the inboard bridge barrier 310 is movable from a partially extended position, to an upright, barrier position, and to a fully extended, bridge position, respectively. In its partially extended position, the bridge barrier 310 reduces the effective height of the lift assembly, thereby allowing the lift platform to be stowed within a compact enclosure. In its fully upright, barrier position, the bridge barrier 310 may prevent a wheelchair from moving off the inboard edge of the lift deck 60. In its fully extended, bridge position, the bridge barrier 310 forms a bridge between the lift deck and floor of the bus so that a wheelchair may exit the lift assembly and enter the interior of the inter-city bus or other vehicle. As shown in FIGS. 11A and 11B, the inboard bridge barrier 310 is actuated by a manually operated hand lever assembly 320 through its associated linkage 324.

As best shown in FIG. 11A, the hand lever assembly 320 includes an elongated lever 328 coupled to a base structure 330. The base structure 330 includes a flange section 332 fixedly connected to a slide shaft 336 for rotation therewith. The slide shaft 336 extends underneath the lift deck and connects to the associated linkage 324 on the opposite side of the lift platform 32. The slide shaft 336 is movably retained within horizontally disposed elongated slots 340A and 340B formed in side curbs 64A and 64B. As such, the slide shaft 336, and thus, the hand lever assembly 320 is permitted to translate in a substantially horizontal direction. The base structure 330 includes an opening into which one end of the lever 328 extends. The elongated lever 328 is rotatably coupled to the base structure 330 by a pivot pin 344 (See FIG. 9B). The pivot pin 344 is disposed orthogonal to the lift deck, thus, allowing the elongated lever 328 to pivot laterally outward from the side curb 64B about a vertical axis. The elongated lever 328 is preferably tubular in shape and terminates at its free end into a handle grip 346 configured to be grasp by hand by the operator.

To prevent the bridge barrier 310 from accidentally moving to the bridge position while lifting a passenger, the lever 328 is locked in the position shown in phantom in FIG. 11B. To lock the lever 328 into position, the lever 328 includes a tubular projection 350 (see also FIG. 6) connected to the lever 328 that extends into an opening 352 formed in a section of the lift platform, which may be coupling link 380B as will be described in more detail below. Optional clip 356 that clampingly receives the handle may also be used.

On the other side of the lift platform 32 shown in FIG. 11A, the slide shaft 336 (hidden by the links) is fixedly connected to the associated linkage 324. The linkage 324 includes a bridge barrier driving link 360 and a bridge barrier coupling link 362. One end of the driving link 360 is fixedly connected to the slide shaft 336 for rotation therewith and translation along the slot 340A. The opposite end of the driving link 360 is rotatably attached to the outboard end of the coupling link 362 by a pivot pin 366. The inboard end of the coupling link 362 is rotatably attached to a side flange 370A of the bridge barrier 310 by a pin 372, which is fixed to the side flange 370A at a position space-apart from the hinge 314. In the embodiment shown, an extension damper 374 may be provided to dampen the rotational movement of the bridge barrier 310. The extension damper 374 at one end is rotatably connected to the pin 372 of the side flange 370A and is rotatably attached to the slide shaft 336 at the other. Extension dampers of the type practiced by the present invention are well known, and thus, will not be described in any further detail.

Referring now to FIGS. 11A and 11B, to rotate the bridge barrier 310 from the upright, barrier position to the extended, bridge position, the lever 328 is unlocked and rotated in the inboard direction. To unlock the lever 328, the lever 328 is pivoted laterally outward about the pivot pin 344 (see FIG. 9B) until the end of the projection 350 clears the opening 352. Once the lever 328 has been unlocked, the lever 328 is rotated by the handle 346 in the direction of the bridge barrier 310 about the axis defined by the slide shaft 336. As the lever 328 rotates, the slide shaft 336 rotates, which in turn, rotates the driving link 360 in the direction of the bridge barrier 310. The driving link 360, due to its connection to the bridge barrier 310 through the coupling link 362, applies a force against the bridge barrier 310, causing the bridge barrier 310 to rotate about the hinge 314 to its extended, bridge position.

FIGS. 8A and 8B illustrates the bridge barrier in the partially extended position. In the partially extended position, the hand lever assembly 320 is in the locked position and positioned such that the slide shaft 336 is contacting the inboard end of the slot 340B (hidden in FIG. 8B). Likewise, the linkage 324 is positioned such that the slide shaft 336 is contacting the inboard end of the slot 340A. In operation, to actuate the bridge barrier 310 from the partial extended position, shown in FIGS. 8A and 8B, to the upright, barrier position, shown in FIGS. 9A and 9B, the hand lever assembly 320 is translated along the slot 340B from the inboard end of the slot to the outboard end of the slot. As the hand lever assembly 320 moves along the slot, the slide shaft 336 moves, which in turn, simultaneously translates the linkage 324, causing the bridge barrier 310 to rotate about the hinge 314 to the upright, barrier position. It will be appreciated that the length of the slots 340A and 340B, the geometry of the linkage 324, and the connection location to the bridge barrier 310 are specifically designed to achieve this movement. One method of translating the hand lever assembly and the associated linkage will be described in more detail below.

While the handrails 106A and 106B and the bridge barrier 310 may be actuated separately and apart from one another, in accordance with one feature of the present invention, the lift platform 32 is configured such that when the handrails are moved from the retracted to the extended position, the bridge barrier 310 automatically moves from a partially extended position to its upright, barrier position. In the embodiment shown in FIGS. 11A and 12, this is accomplished by coupling links 380A and 380B.

Figure 12:
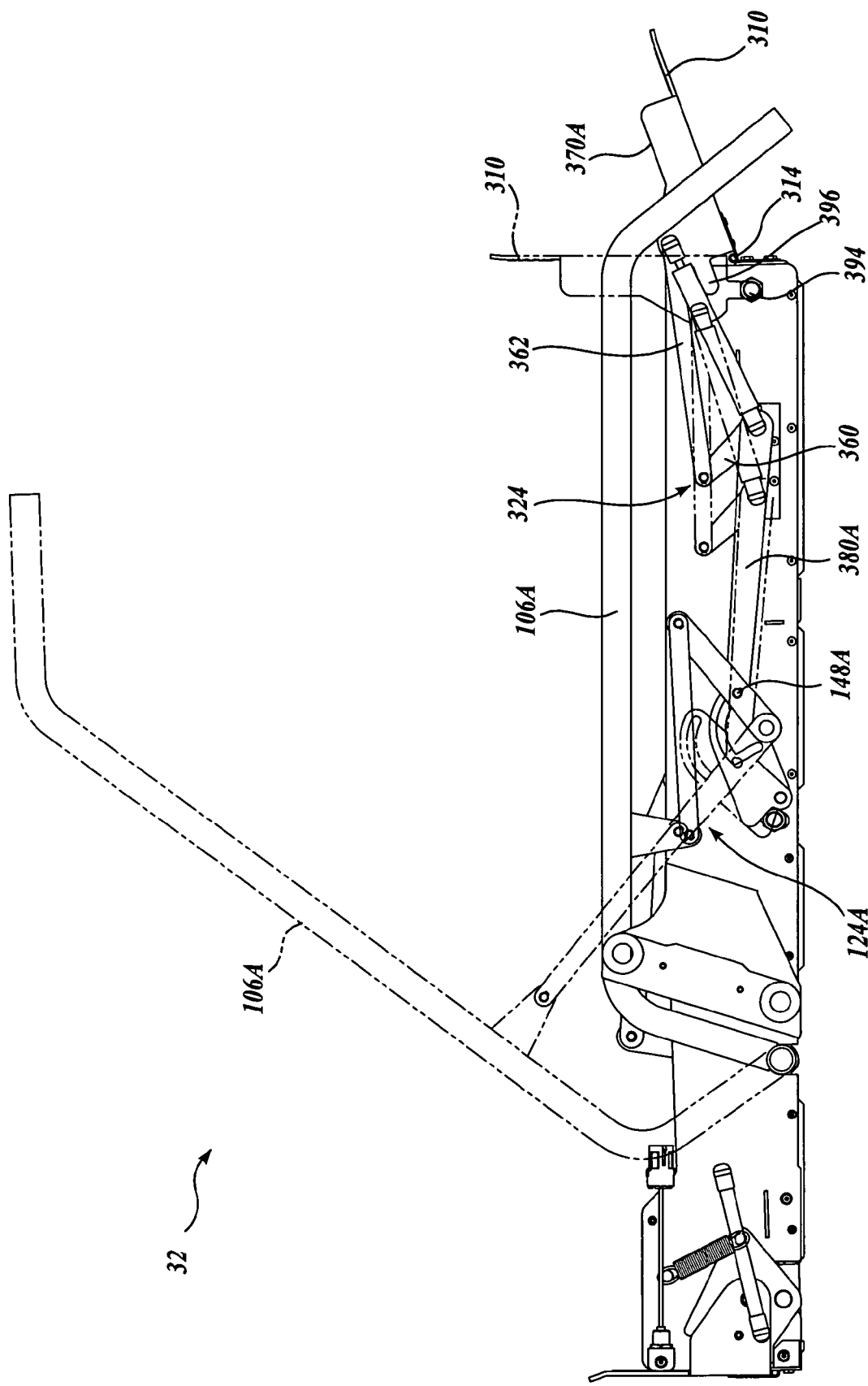
FIG. 12 is a side elevational view depicting the automatic movement of the inboard bridge barrier from its partial retracted position to its barrier position when the handrails are raised from the retracted position to the extended position.

Referring now to FIGS. 11A, 11B, and 12, coupling links 380A and 380B are connected between the linkage 324 and the lock assembly 124A and the hand lever assembly 320 and the lock assembly 124B, respectfully. As shown in FIG. 12, the end of the coupling link 380A is rotatably attached to the slide shaft 336 and the distal end is rotatably attached to the ground link 128A by the slot pin 148A. Similarly, the coupling link 380B shown in FIG. 11A is rotatably attached to the slide shaft 336 and is rotatably attached to the ground link 128B by the slot pin 148B. The coupling link 380B may include the opening 352 for receiving the protrusion 350 of the lever 328 such that the lever is locked in the down position.

As best shown in FIG. 12, as the handrails 106A and 106B move from the retracted position to the extended position shown in phantom, the coupling links 380A and 380B translate, causing the slide shaft 336 to translate from the inboard ends of the slots 340A and 340B to the outboard ends of the slots. This, in turn, causes the linkage 324 to translate in the outboard direction thereby rotating the bridge barrier 310 into the barrier position.

In addition to mechanically locking the inboard bridge barrier 310 into the upright, barrier position, the lift platform 32 may include third and/or fourth electrical disablers that prevent raising and lowering of the lift platform 32 when the inboard bridge barrier 310 is not locked into its barrier position. In one embodiment of the present invention shown in FIG. 11A, the third electrical disabler is a proximity sensor 390 mounted to the side of the lift platform 32 at the location of the opening 352. As the lever 328 rotates into the locked position, a target formed by the projection 350 moves in front of the electronic proximity sensor 390. When the sensor 390 senses the target, it provides a signal to the control system indicating that the lever 328 is locked in the down position. As shown in FIG. 12, the fourth electrical disabler is a proximity sensor 394 mounted on the side curb 64A adjacent the bridge barrier 310. As the bridge barrier rotates into the barrier position, a target 396 formed by a portion of the side flange 370A moves in front of the electronic proximity sensor 394. When the sensor 394 senses the target, it provides a signal to the control system indicating that the bridge barrier 310 is in the upright, barrier position. Accordingly, as long as the control system receives signals indicating that the lever is locked in the down position and the bridge barrier is in the barrier position, the control system is permitted to raise and lower the lift platform 32. If the control system does not receive such signals, then the control system is inhibited from raising and lowering the lift platform 32.

The lift assembly 20 may further include a fifth electrical disabler that prevents retracting the deployed lift platform 32 to the stowed position unless the handrails 106A and 106B are in the retracted position. In one embodiment of the present invention as best shown in FIGS. 3 and 5, the fifth electrical disabler is a sensor 400, such as a limit switch, mounted to the lift arm cross member 79. Upon the handrails 106A and 106B achieving the retracted position, handrail portion 108B contacts the sensor 400. Accordingly, the control system receives a signal indicating that the handrail is retracted and permits the control system to reciprocate carriage 28 to the stowed position. If the control system does not receive such a signal, then the control system is inhibited from stowing lift platform 32.

The operation of the illustrated embodiment of the lift assembly 20 will now be described with reference to FIGS. 1-16C. During standard operation of the bus or other vehicle on which the lift assembly 20 is mounted, the lift assembly 20 is maintained in its stowed position (see FIG. 2) within a baggage compartment BC underneath the bus. When the vehicle stops in order to load a wheelchair or other disabled passenger onto the vehicle, the lift assembly 20 moves as follows. The operator signals the control system through a standard control panel having a plurality of control switches 34 to actuate the carriage 28 from the stowed position shown in FIG. 2 to the deployed position shown in FIG. 3, wherein the lift platform 32 extends outward from the bus B, parallel to the bottom floor F of the baggage compartment BC.

In the deployed position, the handrails 106A and 106B are retracted, the inboard bridge barrier 310 is partial extended, and the ramp barrier 240 is in its upright, barrier position. In an embodiment where the lift platform 32 is inhibited from raising or lowering due to safety concerns without the handrails 106A and 106B in their extended positions, the operator actuates either handrail 106A or 106B from the retracted position to the extended position shown best in FIG. 12. As was described in detail above, as the handrails 106A and 106B rotate to the extended position, the bridge barrier 310 automatically moves from its partial extended position to its upright, barrier position shown in phantom in FIG. 12.

After the handrails 106A and 106B have achieved and are locked in the extended position by the handrail lock assemblies 124A and 124B, and the bridge barrier 310 has automatically been actuated into its upright, barrier position, the control system may lower the lift platform 32 to ground level. A sensor (not shown) for indicating contact with the ground may be provided to stop the downward motion of the lift platform 32. Once the lift platform 32 is lowered to ground level, the ramp barrier 240 may then be actuated by applying force to the deploy pedal 276 so that the ramp barrier 240 is released and rotated to engage the ground or curb. In the ramp position shown in FIG. 5, the ramp barrier 240 provides a ramp between the ground and the lift deck 60, permitting a wheelchair to be rolled onto the lift platform 32.

After entry of a wheelchair onto the lift deck 60, the ramp barrier 240 is actuated to its upright, barrier position by applying force, such as by stepping, on the stow pedal 274 such that the ramp barrier 240 rotates to its vertical, barrier position in the manner described above. In this position, forward or reverse movement of a wheelchair on the lift deck is limited. The lift platform 32 may then be raised to the level of the bus floor. Once the lift platform 32 is raised to the level of the bus floor, the operator actuates the inboard bridge barrier 310 to the bridge position such that the bridge barrier 310 bridges the gap between the lift platform and the floor of the bus. This is accomplished by unlocking the lever 328 and rotating the lever 328 in the inboard direction. The wheelchair occupant may then move the wheelchair into the interior of the bus or other vehicle over the bridge barrier 310.

Once the passenger has boarded the bus B, the operator returns the lift platform to the deployed position by first actuating the bridge barrier 310 to its upright, barrier position. This is accomplished by rotating the lever 328 in the opposite direction and locking the lever into place as described in detail above. The operator may then lower the lift platform 32 to the deployed position, substantially coplanar with the enclosure 24. In one embodiment, sensors may be utilized to determine when the lift platform is in the deployed position. The operator then retracts the handrails 106A and 106B by actuating the handrail release mechanism 180. Once the handrails are in the retracted position, the operator actuates the carriage 28 to reciprocate the carriage 28 to the stowed position.

It will be appreciated that snap rings (not shown) may be used on the ends of each pivot pin to maintain the pivot pins and respective links in place. Bushings or other types of bearings are used in the various links to minimize the friction between the links and the pivot pins.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A lift assembly adapted to be affixed to a vehicle for movement of a load between raised and lowered positions, said lift assembly comprising:
    mounting structure attachable to said vehicle;
    carriage structure associated with said mounting structure, said carriage structure movable along said mounting structure between a stowed position and a deployed position;
    platform structure having opposite first and second sides and inboard and outboard ends, said platform structure being moveably coupled to said carriage structure for movement between raised and lowered positions and a stowable position existing in-between said raised and lowered positions;
    first and second handrails pivotally coupled to said platform structure, said first and second handrails being movable between an extended position in which said first and second handrails extend upwardly from said platform structure, and a retracted position in which said first and second handrails are arranged along said first and second sides of said platform structure, respectively, wherein movement of at least one handrail to said extended position automatically locks said at least one handrail in said extended position; and
    a handrail release lever associated with said platform structure, wherein movement of said handrail release lever unlocks said at least one handrail, thereby allowing said at least one handrail to move from said extended position to said retracted position.

2. The lift assembly of claim 1, wherein said at least one handrail is locked in said extended position by a lock assembly, said lock assembly comprising:
    a latch engagement member associated with said at least one handrail; and
    a latch biased into engagement with said latch engagement member when said at least one handrail has attained said extended position, thereby locking said at least one handrail in said extended position.

3. The lift assembly of claim 2, wherein movement of said handrail release lever disengages said latch from said latch engagement member, thereby unlocking said at least one handrail so that said at least one handrail may articulate to said retracted position.

4. The lift assembly of claim 3, further including handrail release linkage interconnecting said handrail release lever and said latch.

5. The lift assembly of claim 1, wherein said first handrail is linked to said second handrail causing contemporaneous movement therewith.

6. The lift assembly of claim 1, wherein said first and second handrails are locked in said extended position by lock assemblies, each of said lock assemblies including:
    a first link having first and second ends, said first link pivotally connected at said first end to said platform structure;
    a second link having first and second ends, said second link pivotally connected at said first end to said second end of said first link and pivotally connected at said second end to said first or second handrail;
    a latch pin connected to one of said links; and
    a latch plate associated with said platform structure and biased into engaged with said latch pin, thereby locking said first or second handrail in said extended position.

7. The lift assembly of claim 1, further comprising a first drive assembly conditionally operated for effecting reciprocal movement of said carriage structure between said stowed and deployed positions, a second drive assembly conditionally operated for effecting reciprocal movement of said platform structure between said raised and lowered positions, and an electronic disabler for disabling the operation of either said first or said second drive assembly based on said position of said first or second handrail.

8. The lift assembly of claim 1, further comprising an inboard barrier pivotally connected to said lift platform at said inboard end, said inboard baffler being movable between a bridge position, a safety baffler position, and a stowable position in which said platform structure may be moved by said carriage structure between said carriage stowed and carriage deployed positions.

9. The lift assembly of claim 8, further comprising a lever linked to said inboard barrier for effecting movement of said inboard barrier between said bridge position and said safety barrier position, said lever being movable between a first position in which said inboard barrier is in said bridge position and a second position in which said inboard barrier is in said safety barrier position, wherein said lever includes a handle portion that may be grasped by an operator to manually manipulate said lever.

10. The lift assembly of claim 9, wherein said lever may be locked in said second position, thereby locking said inboard baffler in said safety barrier position.

11. The lift assembly of claim 10, wherein said lever includes a projection, said lever being locked by said projection extending into an opening in said platform structure.

12. The lift assembly of claim 9, further comprising an electronic disabler for disabling the operation of said second drive assembly based on said position of said lever or said position of said inboard barrier.

13. The lift assembly of claim 1, further comprising an outboard barrier pivotally connected to said platform structure at said outboard end, said outboard barrier movable between a ramp position and a safety barrier position.

14. The lift assembly of claim 13, further comprising an outboard barrier locking latch associated with one side of said platform structure proximate said outboard end, said latch including an engagement structure, and a latch engagement member associated with said outboard barrier, said latch engagement member positioned and configured to cooperate with said engagement structure for locking said outboard barrier in said safety barrier position.

15. The lift assembly of claim 14, wherein said engagement structure is a slot and said latch engagement member is a latch pin.

16. The lift assembly of claim 13, further comprising an electronic disabler for disabling the operation of said first or said second drive assembly based on said position of said outboard barrier.

* * * * *

UNITED STATES PATENT AND TRADEMARK OFFICE
CERTIFICATE OF CORRECTION

PATENT NO. : 7,326,024 B2 Page 1 of 1
APPLICATION NO. : 10/782535
DATED : February 5, 2008
INVENTOR(S) : A. Cohn et al.

It is certified that error appears in the above-identified patent and that said Letters Patent is hereby corrected as shown below:

| COLUMN | LINE | ERROR |
|---|---|---|
| 19 (Claim 8, | 3 line 3) | "baffler" should read --barrier-- |
| 19 (Claim 8, | 4 line 4) | "baffler" should read --barrier-- |
| 19 (Claim 10, | 19 line 3) | "baffler" should read --barrier-- |

Signed and Sealed this

Twenty-fourth Day of June, 2008

JON W. DUDAS
*Director of the United States Patent and Trademark Office*